US012321622B2

(12) United States Patent
Mandava et al.

(10) Patent No.: US 12,321,622 B2
(45) Date of Patent: Jun. 3, 2025

(54) DEFERRED ECC (ERROR CHECKING AND CORRECTION) MEMORY INITIALIZATION BY MEMORY SCRUB HARDWARE

(71) Applicant: Intel Corporation, Santa Clara, CA (US)

(72) Inventors: Sreenivas Mandava, Los Altos, CA (US); John V. Lovelace, Driftwood, TX (US)

(73) Assignee: Intel Corporation, Santa Clara, CA (US)

( * ) Notice: Subject to any disclaimer, the term of this patent is extended or adjusted under 35 U.S.C. 154(b) by 760 days.

(21) Appl. No.: 17/411,960

(22) Filed: Aug. 25, 2021

(65) Prior Publication Data

US 2021/0382640 A1 Dec. 9, 2021

(51) Int. Cl.
*G06F 3/06* (2006.01)
*G06F 11/10* (2006.01)

(52) U.S. Cl.
CPC .......... *G06F 3/0632* (2013.01); *G06F 3/0619* (2013.01); *G06F 3/0652* (2013.01); *G06F 3/0679* (2013.01); *G06F 11/1068* (2013.01)

(58) Field of Classification Search
None
See application file for complete search history.

(56) References Cited

U.S. PATENT DOCUMENTS

| 6,721,868 | B1 | 4/2004 | Natu et al. | |
|---|---|---|---|---|
| 7,493,460 | B2 | 2/2009 | Zimmer et al. | |
| 11,347,664 | B1 | 5/2022 | Samuel et al. | |
| 2007/0214347 | A1 | 9/2007 | Rothman et al. | |
| 2009/0287900 | A1* | 11/2009 | Kirscht | G06F 9/4406 711/E12.002 |
| 2017/0168849 | A1 | 6/2017 | He et al. | |
| 2018/0165100 | A1 | 6/2018 | Natu et al. | |
| 2019/0340063 | A1* | 11/2019 | Chao | G06F 11/0772 |
| 2020/0341776 | A1 | 10/2020 | Krishnaprasad et al. | |
| 2021/0407565 | A1* | 12/2021 | Contreras | G11C 7/1048 |

FOREIGN PATENT DOCUMENTS

WO  2022066178 A1  3/2022

OTHER PUBLICATIONS

Extended European Search Report for Patent Application No. 22185302.1, Mailed Dec. 21, 2022, 8 pages.
European First Office Action, (EP Exam Report Article 94(3) EPC), for Patent Application No. 22185302.1, Mailed Dec. 19, 2024, 5 pages.

* cited by examiner

*Primary Examiner* — Baboucarr Faal
(74) *Attorney, Agent, or Firm* — Compass IP Law PC

(57) ABSTRACT

Initialization of a memory can have different phases, first initializing a portion of memory for BIOS (basic input/output system) and initializing other portions of memory while the BIOS is operating. The initialization of the memory can be performed by the error scrub engine. In a first mode of operation, the scrub engine can initialize memory locations, then transition to performing scrub operations.

16 Claims, 11 Drawing Sheets

DEFERRED ECC (ERROR CHECKING AND CORRECTION) MEMORY INITIALIZATION BY MEMORY SCRUB HARDWARE

FIELD

Descriptions are generally related to memory systems, and more particular descriptions are related to memory initialization.

BACKGROUND

In a system that has ECC (error checking and correction) memory, the memory needs to be written with valid data at boot time prior to reading data from the memory during normal operation. The operation to write valid data to memory is commonly referred to as memory initialization or Meminit. Meminit can add significant latency to the system boot process.

As system configuration use more memory channels with multiple DIMMs (dual inline memory module) per channel and increasing memory capacity, the initialization time negatively impacts the boot process, which can affect manufacturing flows, validation processes, as well as runtime deployment.

Traditionally, a hardware state machine operates on memory address space to perform memory initialization, writing all zeros to the memory, which results in valid ECC. Even at maximum bandwidth by issuing back-to-back writes on all memory channels concurrently, the total time for initialization of hundreds of gigabytes (GB) or terabytes (TB) of memory delay system boot.

In certain systems with small amounts of memory, DMA (direct memory access) engines can be used to configure upper system address space after lower system memory address space is initialized. However, DMA engine or multithreaded software initialization must map the memory space directly to the system address space. In larger systems, especially server configurations, the complication of multiple levels of interleave logic to map system address space to physical address space is non-trivial, and the added complexity could introduce other issues. Additionally, such approaches require reserving processing resources to implement the upper-address initialization, which would effectively delay the system start.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
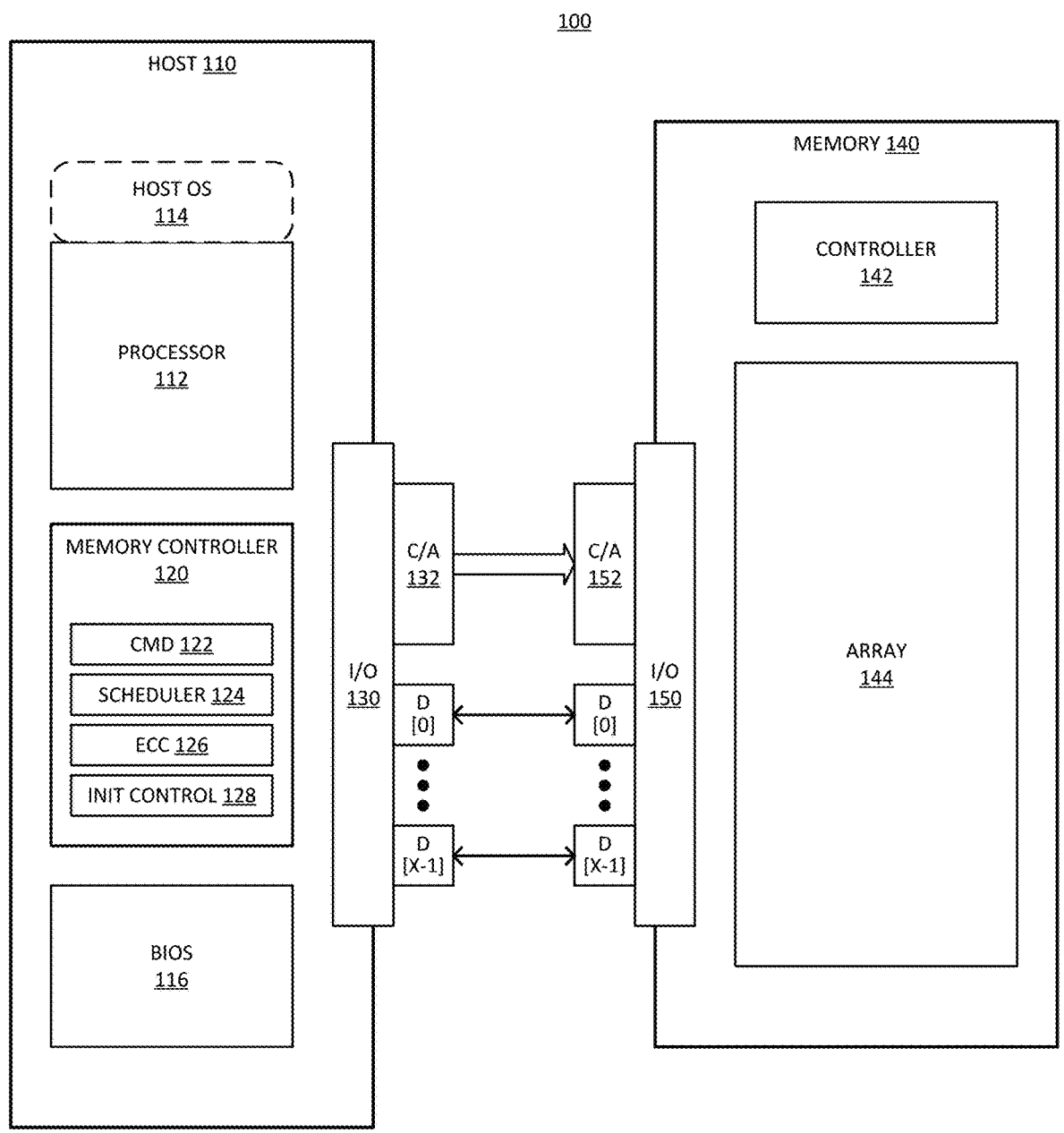
FIG. 1 is a block diagram of an example of a system for memory initialization.

Descriptions of certain details and implementations follow, including non-limiting descriptions of the figures, which may depict some or all examples, and well as other potential implementations.

DETAILED DESCRIPTION

As described herein, initialization of a memory or Meminit can have different phases, first initializing a portion of memory for BIOS (basic input/output system) and initializing other portions of memory while the BIOS is operating. The memory initialization can be initialization of ECC (error checking and correction) memory. The initialization of the memory can be performed by the error scrub engine of the memory controller. In a first mode of operation, the error scrub engine can initialize memory locations, then transition to another mode to perform error scrub operations.

In one example, the error scrub engine (alternatively referred to as error scrub hardware) is configured to speed up OS (operating system) boot time. In one example, the capability to write zeros is added to the error scrub hardware. Thus, the error scrub hardware can selectively write the memory to a known good value, enable initialization through the error scrub engine in response to operation of the operating system or BIOS (basic input/output system).

In one example, the system provides configuration parameters for initialization that enable the initialization of a portion of memory to allow execution of the BIOS or operating system. Then the system can load the operating system prior to completion of the memory initialization, without needing a separate DMA (direct memory access) engine. In one example, the application of the error scrub engine to memory initialization can include an additional hardware flow in the memory controller to load and run BIOS from memory simultaneously with initialization of application memory space. In one example, the memory controller is an integrated memory controller, which represents memory controller circuitry implemented on a processor chip.

Simultaneous execution of the operating system and the completion of initialization of the memory can enable the system to handle errors while finishing initialization of the memory. The hardware flow can allow address and data errors on the memory channel to be handled correctly without disrupting the flow or requiring software intervention. In one example, the memory channel is a DDR (double data rate) channel, which includes a DDR data bus. The system can handle such data errors correctly for memory accesses that have already been initialized, as well as for accesses to memory addresses that are yet to be initialized.

The initialization in stages or in phases can significantly improve boot time of computer systems by allowing the operating system (e.g., BIOS) to be enabled without waiting for initialization of the entire memory space to complete. In one example, the system begins with the amount of memory initialized to enable execution of the operating system, and the system expands the address space of memory as initialization is completed. In one example, the system hot-adds memory as it is initialized, or hot-adds portions or chunks of memory as it is initialized.

In one implementation, boot speedup is expected to be improved by an order of magnitude with the described initialization, as compared to the traditional initialization where the system waits to execute the operating system until all memory is initialized. Initialization with the error scrub hardware (e.g., the error scrub engine) can enable speedup of the boot process while allowing the memory controller to handle memory data or command parity errors as they would normally be handled, without requiring BIOS routines or memory initialization to be aborted or replayed.

FIG. 1 is a block diagram of an example of a system for memory initialization. System 100 illustrates memory coupled to a host. Host 110 represents a host computing system or host elements of a computing system. An example of host 110 can represent a CPU SOC. Host 110 includes host hardware such as processor 112 and memory controller 120. The host hardware also includes hardware interconnects and driver/receiver hardware to provide the interconnection between host 110 and memory 140. Memory 140 includes array 144, which represents a memory array to store data for host 110. Memory controller 120 controls access to memory 140.

The host hardware supports the execution of host software on host 110. The host software can include host OS (operating system) 114. Host OS 114 represents a software platform executed by processor 112 under which other software will execute. Host OS 114 provides control to enable interfacing with hardware interconnections to couple to memory 140.

During execution, host OS 114 provides requests to access memory 140. The requests can be directly from host OS software, requests through APIs (application programming interfaces), or other mechanisms for a program executing under host OS 114 to request memory access. Memory access can include a write of data to array 144 or a read of data from array 144. In response to a host memory access request, memory controller 120 maps host-based addressing for memory resources to physical address locations of memory 140.

Host 110 includes I/O (input/output) 130 to interconnect with memory 140. Memory 140 includes corresponding I/O 150. In one example, the interconnection of I/O 130 with I/O 150 is a double data rate (DDR) memory channel. In one example, memory 140 represents multiple DIMMs (dual inline memory modules), which include multiple memory devices, such as dynamic random access memory (DRAM) devices. In the case of a DIMM, there can be buffered DIMMs which include data buffers on the data bus between host 110 and individual memory devices.

C/A (command/address) 132 represents interface hardware including signal line interfaces to enable memory controller 120 to send commands to memory 140. C/A 152 represents interface hardware including signal line interfaces for memory 140 to receive commands issued by memory controller 120.

D[0:X−1] represent interface hardware including signal line interfaces to enable host 110 and memory 140 to exchange data associated with a command. D[0:X−1] represent a data bus with X data (DQ) lines. The representation of the data bus can be for an individual device or collectively for all memory devices (e.g., 4 or 8 DQ (data) signal lines for an individual memory device, or 72 or 80 or some other number of DQ signal lines for the memory devices of a DIMM). C/A 132 and C/A 152 represent interfaces to a command bus. For write commands, I/O 130 will drive the data bus. For read commands, I/O 150 will drive the data bus.

In one example, memory controller 120 includes command logic (CMD) 122. CMD 122 enables memory controller 120 to generate and send commands to memory 140. In one example, memory controller 120 is active in an initialization routine to send commands to memory.

Memory controller 120 includes scheduler 124 to determine the order of commands to send to memory 140. Scheduler 124 can also determine how to order data to send over the data bus. Thus, scheduler 124 can manage the order of commands and data exchange with memory 140.

Memory 140 includes controller 142, which represents a controller or control logic at the memory to receive and process commands from host 110. Controller 142 generates internal commands or internal operations to execute the commands received from memory controller 120. In one example, controller 142 generates internal operations related to initialization of memory 140.

In one example, memory controller 120 includes ECC (error checking and correction) 126, which represents ECC on the host side to perform ECC operations for host 110. It will be understood that memory 140 can include on-die ECC or on memory circuitry to perform ECC within memory 140 (not shown). ECC 126 can perform ECC operations on write data to send to memory 140 to generate check bits, and can perform ECC operations on read data from memory 140 with the check bits to perform error correction on the data. In one example, ECC 126 represents hardware utilized by an error scrub engine or scrub hardware that performs a read, correction, and write-back of data to array 144. The error scrub engine can perform a patrol scrub to read the data and check bits from memory 140, perform error correction on the data with ECC 126, and write the corrected data back to array 144.

In one example, memory controller 120 includes initialization (INIT) control 128. Initialization control 128 represents logic within memory controller 120 to perform memory initialization, to initialize array 144 to a known good value as part of a boot sequence. In one example, memory controller 120 can initiate a handshaking sequence with memory 140 as part of a boot sequence. Instead of having CMD 122 and scheduler 124 of memory controller 120 generate and send write commands to initialize array 144, initialization control 128 can initialize array 144. In one example, initialization control 128 includes logic in memory controller 120 as well as hardware to perform initialization writes (such as scrub hardware as described below). In one example, initialization control 128 is or includes a finite state machine (FSM).

In one example, memory controller 120 generates a mode register write (MRW) command to set memory 140 in an initialization mode. In one example, in response to a power-up event, controller 142 includes logic that initiates an initialization sequence, which can include communication with memory controller 120, configuring the communication channel and preparing to receive commands and data. In one example, initialization control 128 utilizes scrub hardware to perform initialization. Instead of performing a read, ECC check, and write back operation, which could result in ECC faults due to the indeterminate state of the memory cells of array 144, the scrub hardware can be configured through selector to simply write zeros to the address indicated for scrub. Thus, the scrub hardware can perform memory initialization prior to being set for scrub operation or patrol scrubbing.

In one example, host 110 represents a host board, which can include BIOS (basic input/output system) 116. BIOS 116 is typically stored in a nonvolatile storage on the motherboard and accessed and executed by processor 112 prior to loading host OS 114. BIOS 116 can perform various system configuration operations, including operations related to the interaction of host 110 and memory 140. BIOS 116 typically boots before host OS 114, which controls the runtime software platform for host 110. BIOS 116 can initiate operation prior to host OS 114, configuring basic system operation and triggering the booting of host OS 114. BIOS 116 can execute in the background during runtime to manage hardware configuration. In one example, BIOS 116 can be considered an operating system for host 110.

In one example, initialization with initialization control 128 is enabled by BIOS 116 through configuration of memory controller 120. In one example, BIOS 116 programs registers of memory controller 120. The register can refer to registers that are exposed as CPU (central processing unit) configuration settings in boot time options. The BIOS can be programmed to set different features through the registers to enable initialization internally by memory 140.

In one example, initialization control 128 initializes array 144 in phases or stages. First, array 144 can be initialized with a portion of memory that will allow BIOS 116 to be loaded into memory 140 for execution by processor 112. In one example, initialization control 128 initializes only a portion of memory 140 needed to execute BIOS 116 (or other system OS), and allows BIOS 116 to begin execution prior to initializing the rest of array 144. Thus, system 100 can initialize the portion of memory 140 needed to allow operation of the OS so the OS does not have to wait for initialization to complete before it begins execution.

After BIOS 116 is loaded and executing, initialization control 128 can continue to initialize the remainder of array 144. In one example, ECC 126 can function as normal once BIOS 116 begins operation. Memory controller 120 can also function as normal, limited to accessing the initialized portion of array 144.

After initialization control 128 has initialized all of array 144, normal operation of system 100 can continue. For an implementation where scrub hardware is used to perform initialization, the scrub hardware can commence normal operation. In one example, initialization control 128 sets the configuration of the scrub hardware once the initialization is complete.

Figure 2A:
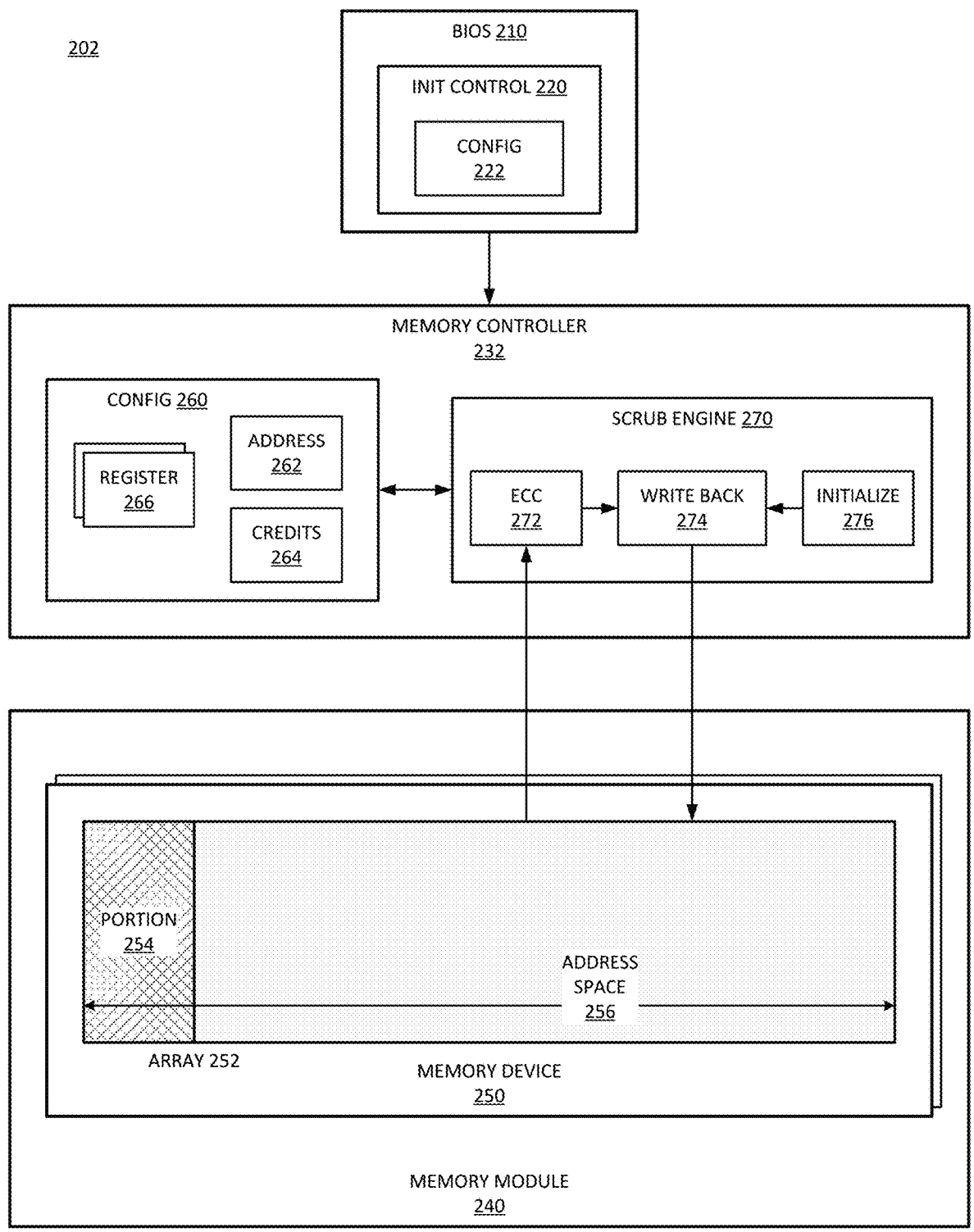
FIG. 2A is a block diagram of an example of a system where memory is initialized in phases with a scrub engine.

FIG. 2A is a block diagram of an example of a system where memory is initialized in phases with a scrub engine. System 202 represents components of a memory subsystem. System 202 provides a system in accordance with an example of system 100 of FIG. 1.

The host for system 202 can include BIOS 210 and memory controller 232. In system 202, the memory is represented as memory module 240 that includes multiple memory devices 250. In one example, memory module 250 represents a dual inline memory module (DIMM) and memory device 250 represents dynamic random access memory (DRAM) devices on the module.

In one example, system 202 includes BIOS 210. BIOS 210 represents a basic operating system that can load on boot of system 202. In one example, BIOS 210 includes initialization (INIT) control 220, which represents logic configured in BIOS 210 to perform initialization operations for the system memory. In one example, initialization control 220 enables BIOS 210 to program configuration (CON FIG. 222 into memory device 250. In one example, configuration 222 represents configuration parameters or settings that are applied to registers 266 of memory controller 232. Configuring registers 266 can enable BIOS 210 to utilize memory controller 232 in conjunction with initialization hardware on memory device 250 to initialize array 252 for boot-up.

In one example, configuration 222 represents configuration parameters or settings that are applied to memory controller 232 for the initialization of memory device 250. In one example, the configuration settings can be applied by memory controller 232 setting registers 266 to configure the operation of initialization with initialization hardware of the memory controller. In one example, initialization control 220 enables BIOS 210 to trigger memory controller 232 to initialize array 252 in portions with different initialization stages or initialization phases.

The total address space of array 252 is represented as address space 256. Portion 254 represents a portion of memory space that can be initialized first, enabling memory device 250 to load an active instance of BIOS 210 into memory for execution. In one example, portion 254 represents a space that is at least sufficient to load BIOS 210. In one example, portion 254 represents a space that is only sufficient to load BIOS 210.

After initialization of portion 254, system 202 can load BIOS into memory and allow it to execute. Memory device 250 can then continue to initialize array 252 until all of address space 256 can been initialized.

In one example, memory controller 232 includes configuration (CONFIG) 260, which represents configuration parameters for initialization of the memory device. Configuration 260 can include registers 266, which can include fields that are written by BIOS 210 or memory controller 232 to configure the operation or the mode of operation for initialization of memory device 250.

In one example, configuration 260 includes address settings 262. Address settings 262 represent address configuration parameters for initialization of array 252. For example, address settings 262 can indicate an address space of portion 254. Thus, when memory device 250 initializes portion 254, system 202 can know that memory space has been initialized to load BIOS and begin to execute the operating system.

In one example, memory controller includes scrub engine 270. Scrub engine 270 provides an example of scrub hardware. Scrub engine 270 enables memory controller 232 to perform memory scrubbing on array 252 for normal operation and initialization of the memory array for initialization operation. Operation of scrub engine 270 to perform a scrub of the entire array within a period of time can be referred to as a patrol scrub. The period of time can be set, for example, to 24 hours, 10 hours, or some other time period. Registers 266 can include setting related to average periodic scrub intervals, which indicate how often a scrub operation needs to be performed to complete the patrol scrub within the time period.

In one example, scrub engine 270 includes or uses ECC 272. ECC 272 represents error checking and correction hardware for memory controller 232. Write back 274 represents hardware of scrub engine 270 that enables scrub engine 270 to write to array 252. In typical scrub operation, scrub engine 270 will read an address of array 252, perform ECC on the data of the address with ECC 272, and write back 274 will write back the corrected data.

In one example, system 202 applies scrub engine 270 for initialization of array 252. In one example, scrub engine 270 includes initialization hardware to support initialization of array 252, represented by initialize 276. In one example, initialization of array 252 involves writing zeros to all address space 256. Other values can be written to array 252, but all zeros is the simplest implementation, because ECC information (all zeros) would be correct for the all zero data values.

As illustrated, initialize 276 can provide information to write back 274, which represents that initialize 276 can provide alternate data for the hardware of write back 274. For example, normal scrub operation can include the loop of ECC 272 generating data to write back based on what is read from array 252 and checked/corrected for errors. Alternatively, write back 274 can be configured to receive data from initialize 276, which provides the initialization values to write to the selected address. In one example, the selection of data from initialize 276 instead of from ECC 272 is selected by configuration settings of configuration 260. In one example, write back 274 can represent memory access hardware. In one example, the memory access hardware is controlled or limited by write credits indicated by credits 264. Credits 264 can represent a credit count for write transactions.

It will be understood that scrub engine 270 already includes hardware and logic to write to array 252. The application of scrub engine 270 in the writing of initialization values to array 252 can eliminate the need for an application of DMA (direct memory access) to perform the initialization. The selection of write back source data between ECC 272 and initialize 276 can provide a simple mechanism that does not involve the complexity that would be associated with the use of a DMA engine.

In one example, system 202 includes memory device 250 with memory array 252 that has an address range of address space 256. scrub engine 270 can be referred to as an error scrubbing engine that can be used for initialization of memory array 252. In one example, the error scrubbing engine initializes portion 254 first, and indicates that portion 254 is initialized prior to initializing a second portion of the remaining address space. In one example, scrub engine 270 can indicate the initialization of portion 254 by writing a value to register 266, which can be read by memory controller 232 and communicated to BIOS 210.

In one example, after scrub engine 270 has completed initialization of portion 254, system 202 loads BIOS 210 into the initialized portion. Scrub engine 270 can then initialize a second portion of memory array 252, continue to initialize different portions until all of address space 256 has been initialized. The second portion of array 252 can be the remainder of address space 256, or can be another portion, where address space 256 is initialized portion by portion. Scrub engine 270 can transition from initialization to performing scrub operations on memory array 252 after address space 256 has been initialized.

In one example, scrub engine 270 writes a value to register 266 to indicate that all address space 256 has been initialized. In one example, BIOS 210 is loaded into portion 254 and begins to execute while scrub engine 270 continues initialization of address space 256. In one example, scrub engine 270 and BIOS 210 share memory access bandwidth to array 252 during initialization of the remainder of the memory while BIOS executes.

In one example, configuration 260 includes credits 264. Credits 264 represent write transaction credits for write transactions to array 252. In one example, sharing the memory access bandwidth can be facilitated through the use of credits 264. For example, credits 264 can limit the number of write transactions scrub engine 270 can generate, leaving bandwidth for BIOS 210 to access array 252.

In one example, credits 264 can represent different values, depending on the stage of operation of scrub engine 270. For example, credits 264 can include an initialization credit that indicates a number of write transactions scrub engine 270 can generate for initialization of portion 254. Credits 264 can include full memory credit or remainder credit or full initialization credit that indicates a number of write transactions scrub engine 270 can generate for initialization of array 252 after portion 254 has been initialized, to initialize the remainder of the memory space. In one example, credits 264 can include a full memory credit.

In one example, the initialization credit can be different from the full memory credit. In one example, either the initialization credit or the full memory credit can be different from the patrol scrub credit. In one example, the patrol scrub credit can be adjusted dynamically. Typically, the patrol scrub credit is very low (e.g., credit=1) to ensure that scrub operations do not impact memory access operations. In one example, whatever write transaction credit is being used, scrub engine 270 can wait for the write transactions to complete after reaching the number of transactions indicated by the credit before issuing additional write transactions. Allowing the transactions to clear can be true for an initialization credit for initialization transactions, or for a patrol scrub credit for scrub transactions.

Figure 2B:
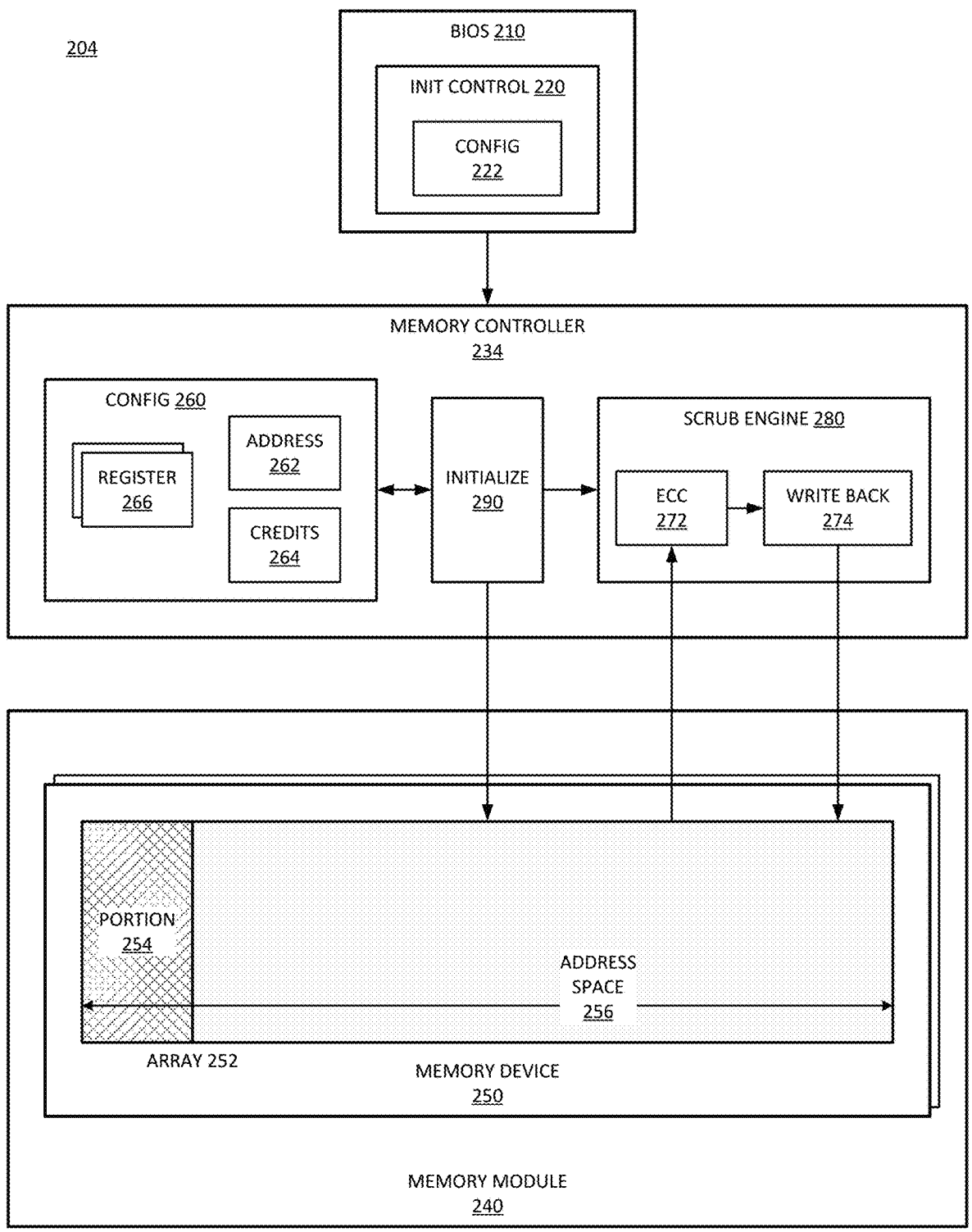
FIG. 2B is a block diagram of an example of a system where memory is initialized in phases with an initialization engine.

FIG. 2B is a block diagram of an example of a system where memory is initialized in phases with an initialization engine. System 204 represents components of a memory subsystem as an alternative to system 204.

System 204 includes BIOS 210, initialization (INIT) control 220, configuration (CONFIG) 222, memory module 240, memory device 250, array 252, portion 254, address space 256, configuration (CONFIG) 260, address 262, credits 264, and register 266, which are described above with reference to system 202. The descriptions above apply to these elements.

System 204 includes memory controller 234 to manage access to memory device 250. The descriptions of memory controller 232 apply to memory controller 234. Whereas memory controller 232 of system 202 includes initialize 276 within scrub engine 270, memory controller 234 includes initialize 290 separate from scrub engine 280.

Initialize 290 represents a separate or standalone initialization engine, which performs initialization operations on memory device 250 based on configuration 260. The initialization operations of initialize 290 can be the same or similar to initialize 276. In one example, instead of sending initialization write data to write back 274, initialize 290 can directly interface with memory device 250 to write the initialization data at the address to be initialized.

In one example, memory controller 234 includes scrub engine 280 with ECC 272 and write back 274, and the operations of ECC 272 and write back 274 are in accordance with what is described above. In one example, initialize 290 performs initialization of memory device 250, and indicates to scrub engine 280 what address ranges are available for scrubbing. Patrol scrub operation can be managed by scrub engine 280 without initialize 290. In one example, scrub engine 280 includes credit information for scrub write credits.

Figure 3:
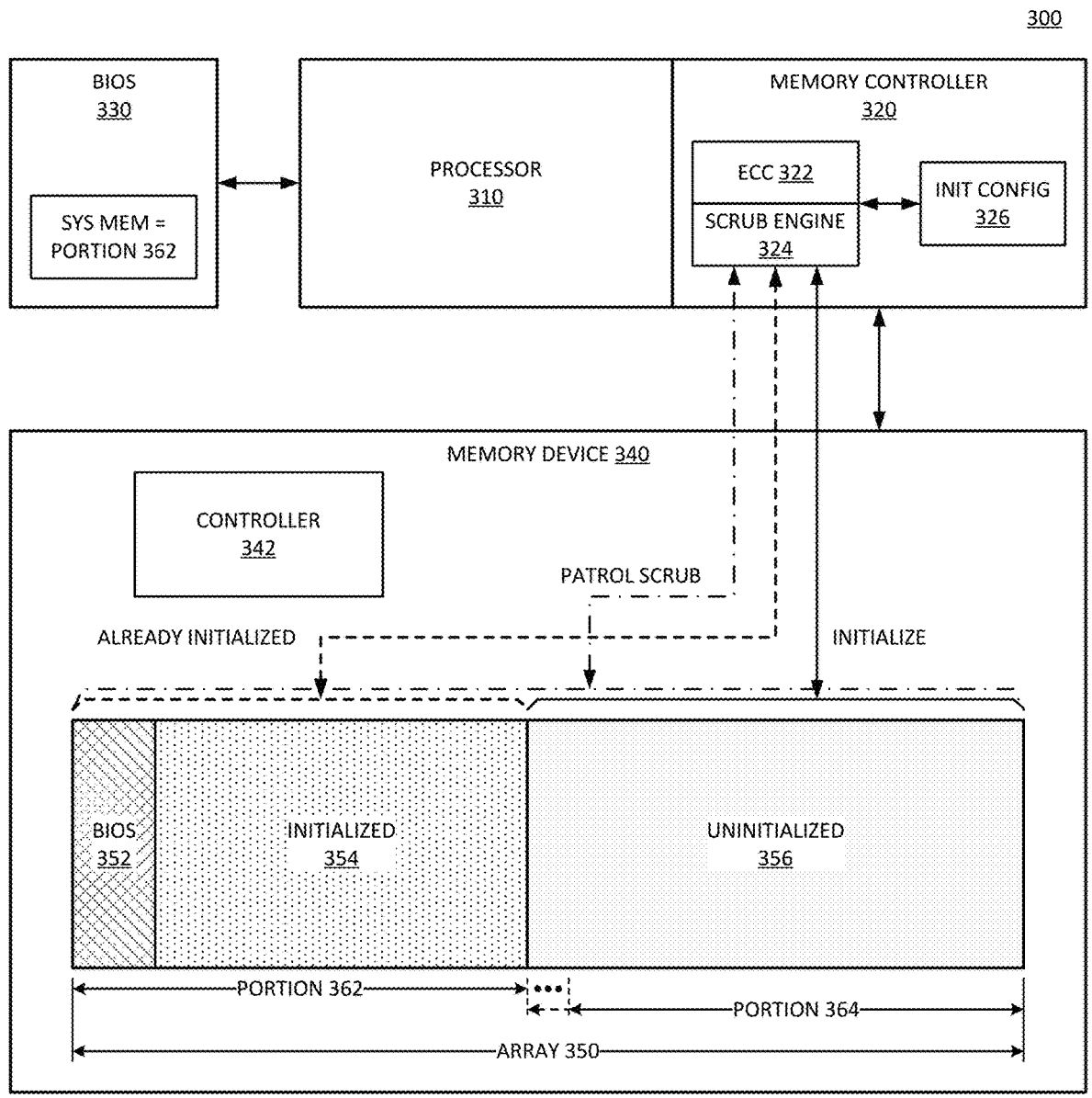
FIG. 3 is a block diagram of an example of a system wherein an error scrub engine initializes memory.

FIG. 3 is a block diagram of an example of a system wherein an error scrub engine initializes memory. System 300 represents a system in accordance with an example of system 100 or an example of system 202 or an example of system 204. System 300 includes hardware in memory that can perform initialization of the memory in stages.

In one example, system 300 includes processor 310, which represents a processor for system 300. In one example, processor 310 includes a CPU. Memory controller 320 represents circuitry to control access to memory device 340. Execution of software by processor 310 generates requests to access data stored in memory device 340. Memory controller 320 interfaces with memory device 340 to write data or to read data. In one example, memory controller 320 is an integrated memory controller (iMC), which is circuitry on the die of processor 310 to implement the memory control operations.

BIOS 330 represents a basic operating system for system 300. Among other functions, BIOS 330 manages initialization of system 300 from the perspective of startup or boot up of the system. In one example, BIOS 330 is loaded into memory device 340 and executes by operations performed by processor 310. In one example, BIOS 330 begins execution on processor 310 when the system starts up. BIOS 330 can trigger the initialization of memory device 340 to provide system memory for execution of BIOS 330 to perform configuration operations and load the system host OS.

Memory device 340 includes memory array 350, which represents the memory cells or storage locations for memory device 340. In one example, memory device 340 includes controller 342, which represents control logic or control hardware in memory device 340 to receive and process commands and data from memory controller 320. Controller 342 represents circuitry and control logic that generates internal operations within memory device 340 to execute the commands received from the host.

In one example, memory controller 320 includes scrub engine 324, which represents scrub hardware in accordance with any example described. In one example, scrub engine 324 performs initialization of array 350 by writing address space of array 350 with a known good value. Scrub engine 324 can initialize memory device 340 and transition from initialization to memory scrubbing, such as patrol scrub operation.

In one example, scrub engine 324 operates in three stages. First, scrub engine 324 performs initialization of memory for BIOS 330, represented by BIOS 352 in array 350. Next, scrub engine 324 can perform initialization of the remaining memory while BIOS 330 can run from the memory space initialized for it (BIOS 352). Next, scrub engine 324 can transition to normal operation after all memory initialization is complete.

In one example, BIOS 352 represents a portion of array 350 that is at least sufficient to load and execute BIOS 330. In one example, BIOS 352 represents a portion of array 350 that is only sufficient to load and execute the BIOS. For example, BIOS 330 can be configured to know how much address space would be needed to load the BIOS in memory, and configure operation of scrub engine 324 to indicate when that address space has been initialized. Then BIOS 330 can be loaded into memory device 340.

It will be understood that initialization of the remaining memory will occur over time. System 300 represents a snapshot of initialization during the second phase of initialization. As illustrated by the dashed lines, at some point, portion 362 of array 350 will be initialized. Portion 362 includes BIOS 352 and initialized memory portion 354. Portion 364 represents uninitialized memory portion 356, which still needs to be initialized. The solid lines represent that scrub engine 324 is initializing uninitialized memory portion 356. After the completion of initializing portion 364, scrub engine 324 can perform patrol scrub over the entire memory array, as indicated by the dashed-dotted line.

Scrub engine 324 can represent memory access hardware of memory device 340 that enables initialization of the address space. In one example, array 350 represents a volatile memory array or volatile system memory space. In one example, scrub engine 324 can perform patrol scrubbing as a patrol error scrub engine for memory device 340 upon completion of initialization of the volatile system memory space.

In one example, BIOS 330 indicates to memory controller 320 the address range of memory in system 300. System 300 illustrates an example where BIOS 330 indicates that the "total" system memory is equal to portion 362, which is the initialized portion of array 350. It will be understood that array 350 has more address space than portion 362. In one example, BIOS 330 only represents to memory controller 320 the amount of initialized address space, and so it does not indicate portion 364 because it is not initialized.

In one example, system 300 support the hot-add of memory address space. In one example, memory device 340 includes one or more registers (such as registers 266 of system 202 or system 204). A register of memory device 340 can store an indication of address space that has been initialized.

In one example, BIOS 330 hot adds an initialized portion of array 350 (the remainder of the memory to be initialized) as it is initialized or after being initialized. The ellipses between portion 362 and portion 364 represents that as scrub engine 324 continues to perform initialization of array 350, initialized portion 354 will increase and uninitialized portion 356 will decrease proportionally. In one example, BIOS 330 polls a register that stores initialization information written by scrub engine 324 to determine when uninitialized portion 356 has been initialized and can be added to the system memory.

In one example, memory controller 320 includes initialization configuration (INIT CONFIG) 326. Initialization configuration 326 represents one or more parameters provided to scrub engine 324 for initialization operation. The parameters can control the behavior of the memory scrub engine. For example, the parameters can include the addresses to access and the number of transactions to perform. Table 1 provides an example of various parameters and their descriptions. It will be understood that system 300 is not limited to the parameters identified in Table 1. An example of system 300 could use more parameters or fewer parameters than what is illustrated in Table 1.

TABLE 1

Initialization Parameters

| Parameter | Description |
| --- | --- |
| Start Address | The starting channel address. Typically, the starting address will be Address 0. Start Address can be the starting address of BIOS (operating system) memory region. |
| BIOS Address Limit | The ending channel address for the BIOS memory region. BIOS occupies the region of memory from the Start Address to BIOS Address Limit. |
| Chan Address Limit | The maximum address on the channel. OS and Applications reside in memory from the address (BIOS Address Limit + 1) to Channel Address Limit. |
| Credits BIOS Init | The total the number of transactions the memory scrub engine can have outstanding in the memory scheduler when BIOS memory is being initialized. Typically, Credits BIOS Init would be programmed to the maximum number of writes that can be outstanding in the scheduler to maximize the bandwidth available to start initialization. The maximum number of writes can be the size of the scheduler's write queue. |
| Credits Mem Init | The total number of write transactions that the memory scrub engine can have outstanding to initialize memory outside of BIOS memory (addresses (BIOS Address Limit + 1) to Channel Address Limit). The value can be set to share credits in the scheduler to be available to BIOS traffic as it accesses the BIOS memory region. The value in this field can control partitioning of the write bandwidth between BIOS traffic and initialization of non-BIOS memory. The higher the value in this field, the faster the non-BIOS memory is initialized but write bandwidth of non-BIOS traffic is impacted. |
| Credits Runtime | The number of credits that used by the memory scrub engine for memory scrub operations after memory initialization is complete, which is the normal functionality of the memory scrubber. Typically, this credit is programmed to 1. |

In one example, BIOS 330 configures parameters such as those in Table 1 into initialization configuration 326. Once the initialization parameters are configured, scrub engine 324 can begin initialization of the memory region used by BIOS 330. In one example, scrub engine 324 issues write transactions to successive memory addresses, beginning with the Start Address, and incrementing the address for each new command.

In one example, scrub engine 324 checks to make sure it does not inject more writes than permitted by the credits, which can be different for different stages of operation. In one example, scrub engine 324 stops injecting new write transactions when the channel address of the injected transaction matches the BIOS Address Limit field. In one example, scrub engine 324 waits for all outstanding transactions to drain before generating more write transactions. Thus, scrub engine 324 can generate write transactions up to the credit limit or the address space limit, and then allow the credits to return to zero before proceeding to the next phase of initialization and generating more write transactions. In one example, when all outstanding transactions issued by scrub engine 324 have completed, the hardware logs the completion status in a register. In one example, BIOS 330 polls the register to determine the completion of initialization of the memory space.

When scrub engine 324 initializes BIOS memory, it can log the completion of the initialization of BIOS memory. BIOS 330 can then start loading the BIOS in memory and running from memory device 340 as the initialization flow starts to write to the rest of array 350. During initialization of array 350 from the start of the address space after BIOS memory to the end of the memory address space, scrub engine 324 can issue write transactions to initialize the remainder of the memory. Again, scrub engine 324 can restrict the number of outstanding transactions to not exceed Mem Init Credits or a comparable value for memory initialization.

In one example, BIOS memory accesses run using the remaining credits for the scheduler's write queue that are not used by Mem Init Credits. In one example, scrub engine 324 does not use any read queue credits for initialization operations. Thus, BIOS memory can use all credits available for the read queue while scrub engine 324 is initializing portion 364. Initialization of portion 364 continues until the Chan Addr Limit address is reached. Scrub engine 324 can then wait for all its write transactions to complete before transitioning to scrub operation. When all transactions are drained, in one example, the hardware can log a status bit (e.g., one or more bits of a register that indicates initialization status) to indicate the completion of memory initialization. BIOS 330 can poll the status bit to determine when initialization is complete. When the status bit or status field is set, BIOS 330 can use the rest of the memory for the boot flow.

In one example, after the completion of memory initialization, scrub engine 324 operates in its default mode to read memory, check and correct ECC errors, and write the corrected data back to memory. In one example, scrub engine 324 issues reads to each address in memory and checks for ECC errors on the read. Scrub engine 324 can limit the number of transactions for scrub operation to memory to the Runtime Credits.

In one example, the operation of scrub engine 324 for initialization allows memory controller 320 to handle errors with memory initialization writes or with BIOS-initiated memory options without affecting memory initialization. Errors that memory controller 320 can handle include data errors with writes or reads as well as command parity errors, requests from BIOS, and errors with scrub engine 324 waiting for transactions to complete from the scheduler. In one example, if an error occurs on a command, the scheduler of memory controller 320 will hold off completion of the command, and replay the command with the appropriate error flow. In one example, the scheduler will return a completion only after the error with the transaction is correctly handled.

In one example, while memory initialization is still in progress, the scheduler compares the address of a read with an ECC error with the current address of the scrub engine 324. If the read ECC error is on an address that is lower than the address in the scrub engine 324, memory controller 320 can use its error control, such as through an ECC correction engine represented by ECC 322, to correct the error and write the corrected data when a correction is found. Alternatively, memory controller 320 can write poisoned data if the error is found to be uncorrectable. If the read ECC error is for an address equal to or higher than the current address in scrub engine 324, instead of attempting an ECC correction on the data, in one example, memory controller 320 will write zeros to the address with the error and return zero data to the requestor. After initialization of all memory is completed, all ECC errors are handled by the ECC correction engine (ECC 322) in memory controller 320. In one example, scrub engine 324 works with ECC 322 to perform the error scrubbing to read data from memory device 340, perform error checking and correction, and write back corrected data to array 350.

In one example, memory controller 320 can handle error detection and correction during initialization operation within resetting the initialization address in use by scrub engine 324. Thus, scrub engine 324 can continue to initialize memory while memory controller 320 handles errors with ECC 322.

Figure 4:
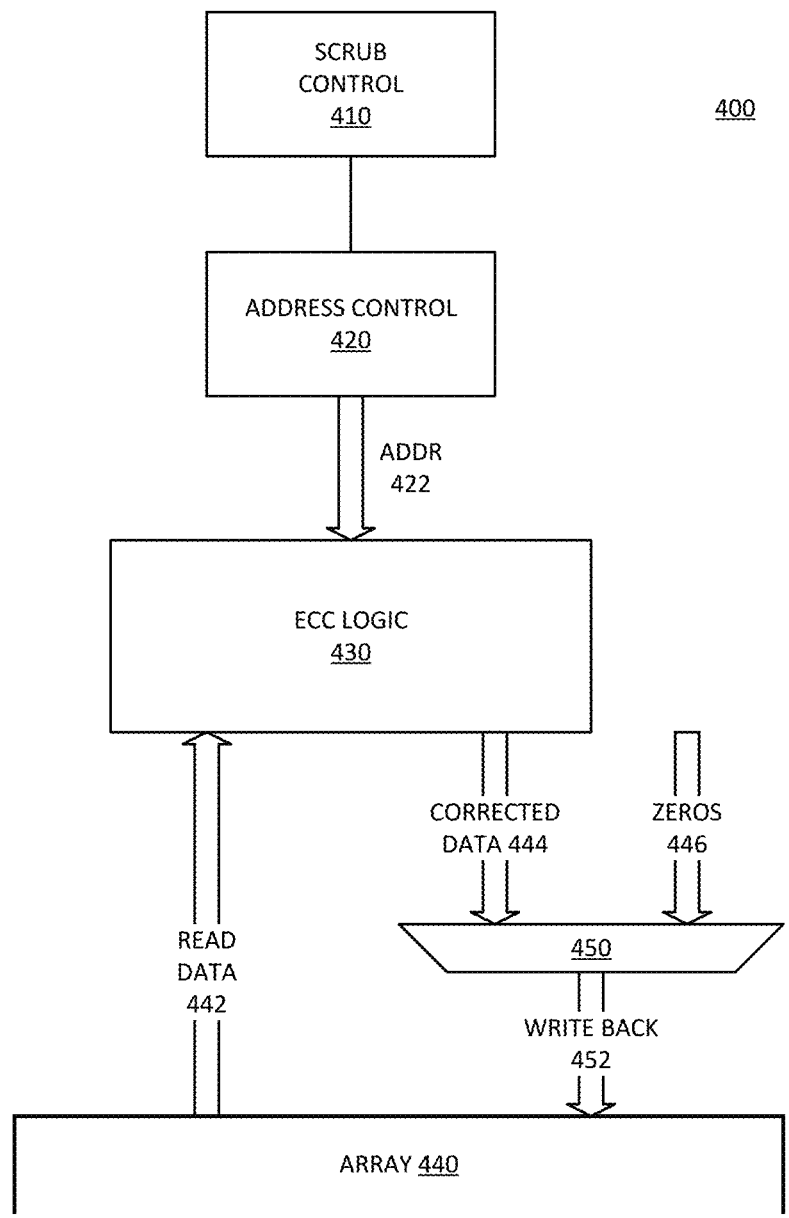
FIG. 4 is a block diagram of an example of an error scrub engine that can perform memory initialization.

FIG. 4 is a block diagram of an example of an error scrub engine that can perform memory initialization. System 400 can be referred to as an error scrubbing system, scrub engine, memory scrubber, error scrub engine, error scrub hardware, or other designation to indicate the checking and correcting of errors in memory. System 400 represents components on the memory controller to scrub the target memory device or devices. Reference throughout to scrub operations or error scrubbing operations can refer to operations by a system in accordance with system 400.

The hardware blocks and operations of system 400 are described below with respect to standard scrub operation. In one example, the standard operation is not initiated until the memory is initialized. Array 440 represents the memory array monitored by the scrub engine. Prior to normal operation of system 400, array 440 needs to be initialized, such as during a boot process.

In one example, system 400 includes mux (multiplexer) or selector 450. Selector 450 enables system 400 to optionally be used to initialize array 440. In one example, selector 450 is selected by an initialization mode for system 400. In response to the initialization mode, the normal operation of system 400 can be completely bypassed, and address (ADDR) 422 can be written with zeros 446, or other initialization value. In one example, selector 450 selects either corrected data 444 or zeros 446 to perform write back 452 for address 422. When in initialization mode, selector 450 selects zeros 446.

Scrub control 410 represents logic or control circuitry to generate control scrubbing operations within system 400. Address control 420 represents control logic to enable the memory controller to manage addressing for scrub operations. In one example, address control 420 includes one or more scrub address counters to increment addresses for scrub commands. Address control 420 can include counters for column addresses, row addresses, bank addresses, bank group addresses, or a combination of these. In one example, address control 420 includes a counter to increment the column address for a row or other segment for a scrub operation.

In one example, address control 420 controls address information based on signals provided from scrub control 410. In one example, address control 420 increments the column address on each error scrub write command. In one example, once the column counter wraps or rolls over, the row counter will sequentially increment and read each code word and associated check bits in the next row until all rows within a bank are accessed. In one example, once the row counter wraps, the bank counter will sequentially increment and the next sequential bank within a bank group will repeat the process of accessing each code word and associated check bits until all banks and bank groups within the memory are accessed. In one example, once the row counter wraps, the bank counter will sequentially increment and the next sequential bank group will repeat the process of accessing each code word and associated check bits until all bank groups within the memory are accessed.

Based on the address information represented by address (ADDR) 422, system 400 can check all code words and check bits within the memory. More specifically, system 400 can perform scrub operations, which include ECC operations to read, check and correct the read data, and write back memory locations for all selected or specified addresses. In one example, system 400 can read the memory array, correct errors with ECC (error checking and correction) logic 430, and write back corrected data. In one example, system 400 can read the memory array and write the data back to the array every time, whether or not ECC 430 detected and corrected an error.

System 400 includes ECC logic 430 to perform error checking and correction operations on selected or addressed memory location(s). As illustrated, ECC logic 430 can read array 440 to retrieve read data 442 from address 422. ECC logic 430 can then perform ECC operations to determine if the address has an error. If an error is detected, ECC logic 430 can correct the error and generate corrected data 444 to write back to array 440. After initialization of array 440 is complete, selector 450 will select corrected data 444 for write back 452.

Figure 5A:
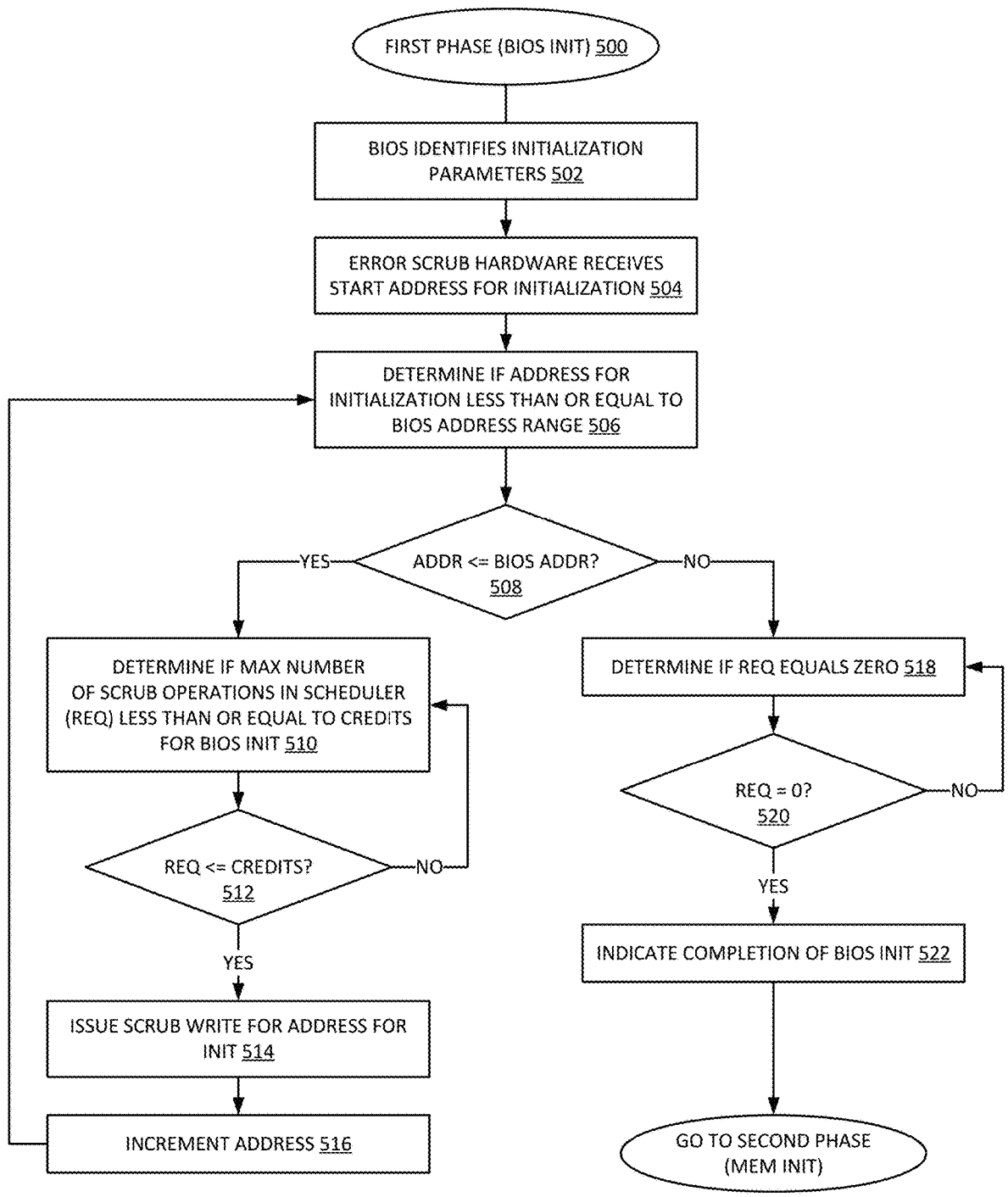
FIG. 5A is a flow diagram of an example of a process for memory initialization of a first memory portion with error scrub hardware.

FIG. 5A is a flow diagram of an example of a process for memory initialization of a first memory portion with error scrub hardware. Process 500 represents a process that can be applied by a scrub engine or error scrub hardware as described herein. Process 500 represents a process for a first phase of error scrub hardware operation, for BIOS initialization.

In one example, the BIOS identifies initialization parameters for the error scrub hardware, at 502. The initialization parameters can include address ranges and write transactions credit limits. In one example, the error scrub hardware receives a start address for initialization, at 504.

The error scrub hardware can determine if the address for initialization is less than or equal to a BIOS address range, at 506. If the address is less than or equal to the BIOS address (ADDR<=BIOS ADDR), at 508 YES branch, then the address is still within the range of the BIOS memory space to be initialized. In one example, the error scrub hardware will perform initialization operations.

In one example, the error scrub hardware can determine if the maximum number of scrub operations in the scheduler (REQ) is less than or equal to the number of credits for BIOS initialization, at 510. The value REQ can represent a number of scrub transactions outstanding in the memory scheduler. Thus, REQ represents transactions issued by the error scrub hardware that are pending and have not issued a completion from the scheduler. If REQ is greater than the number of credits, at 512 NO branch, the error scrub hardware can continue to loop and wait until a credit becomes available to generate a new transaction, at 510.

If REQ is less than or equal to the number of credits, at 512 YES branch, the error scrub hardware can issue a scrub write for the address to be initialized, at 514. The error scrub hardware can increment the address, at 516, and loop back to determine if the address for initialization is within range of the BIOS memory, at 506.

If the address is greater than the BIOS address, at 508 NO branch, then the BIOS memory space initialization is complete. In one example, after the end of the address range has been reached, the error scrub hardware will allow the scrub write transactions to completely drain before beginning the next phase of initialization. Thus, in one example, the error scrub hardware determines if REQ equals zero, at 518. If REQ is not equal to zero, at 520 NO branch, the error scrub hardware can continue to loop to await all transactions to complete, at 518.

If REQ is zero, at 520 YES branch, the error scrub hardware can indicate completion of the BIOS memory range initialization, at 522. The error scrub hardware can then transition to a second phase of operation, for full memory initialization. The BIOS operating system can start execution from memory, with transferring of the BIOS into the initialized system memory.

Figure 5B:
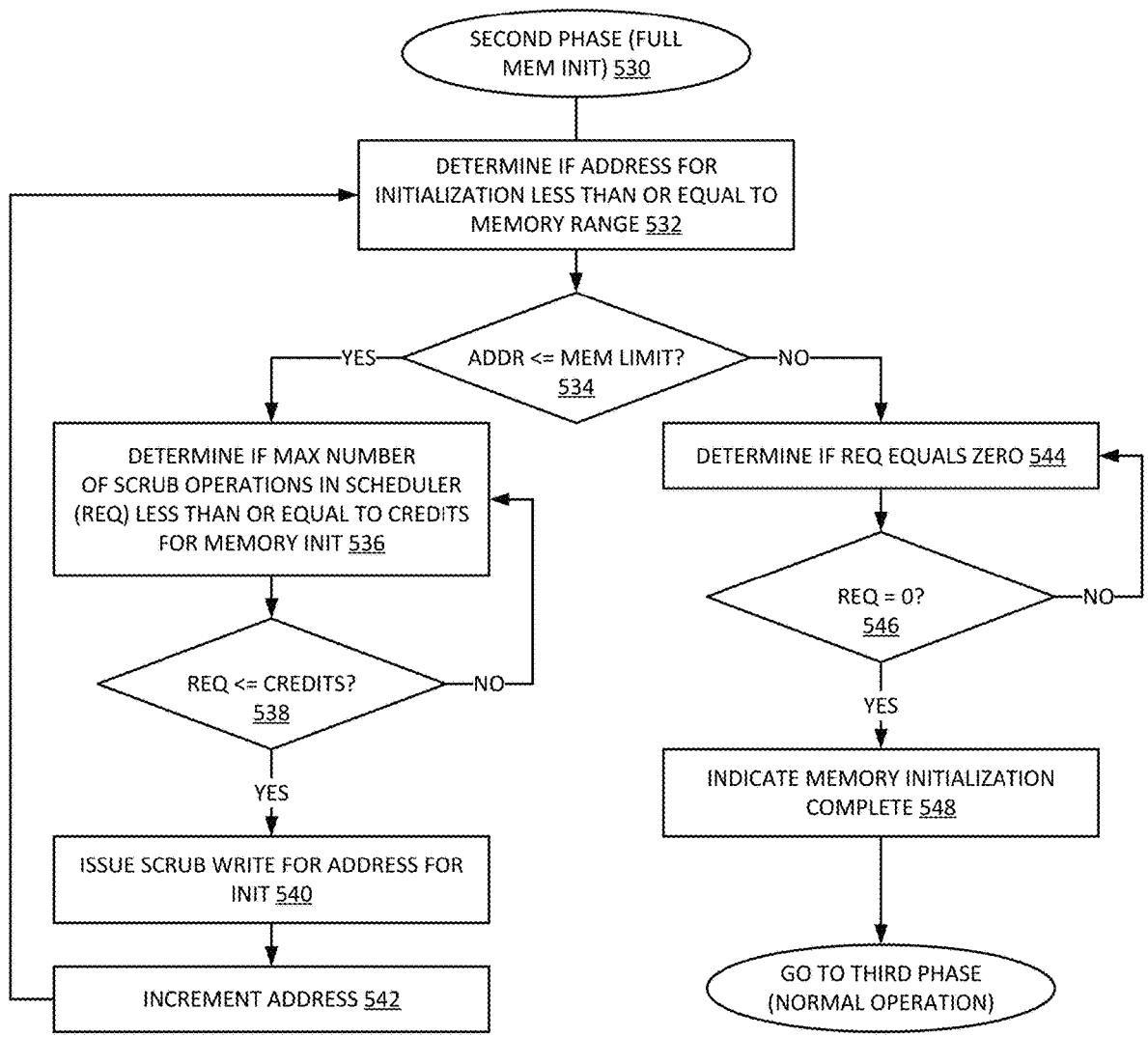
FIG. 5B is a flow diagram of an example of a process for memory initialization of a second memory portion with error scrub hardware.

FIG. 5B is a flow diagram of an example of a process for memory initialization of a second memory portion with error scrub hardware. Process 530 represents a process that can be applied by a scrub engine or error scrub hardware as described herein. Process 530 represents a process for a second phase of error scrub hardware operation, for full memory initialization, after BIOS initialization has completed and BIOS is loaded into memory.

In one example, the error scrub hardware can determine if the address for initialization is less than or equal to a full memory address range, at 532. If the address is less than or equal to the memory address limit (ADDR<=MEM LIMIT), at 534 YES branch, then the address is still within the range of the memory space to be initialized. In one example, the error scrub hardware will perform initialization operations.

In one example, the error scrub hardware can determine if the maximum number of scrub operations in the scheduler (REQ) is less than or equal to the number of credits for full memory initialization, at 536. The REQ is greater than the number of credits, at 538 NO branch, the error scrub hardware can continue to loop and wait until a credit becomes available to generate a new transaction, at 536. The number of credits for the second phase can be considered an interim credit count that can be different from the initialization credit count for the first phase of initialization.

If REQ is less than or equal to the number of credits, at 538 YES branch, the error scrub hardware can issue a scrub write for the address to be initialized, at 540. The error scrub hardware can increment the address, at 542, and loop back to determine if the address for initialization is within range of the memory address limit, at 532.

If the address is greater than the memory address limit, at 534 NO branch, then the full memory space initialization is complete. In one example, after the end of the address range has been reached, the error scrub hardware will allow the scrub write transactions to completely drain before beginning the next phase of operation. Thus, in one example, the error scrub hardware determines if REQ equals zero, at 544.

If REQ is not equal to zero, at 546 NO branch, the error scrub hardware can continue to loop to await all transactions to complete, at 544.

If REQ is zero, at 546 YES branch, the error scrub hardware can indicate completion of the memory initialization, at 548. The error scrub hardware can then transition to a third phase of operation, for normal error scrub operation. In one example, the system hot adds the full memory range to the system memory indicated by BIOS.

Figure 5C:
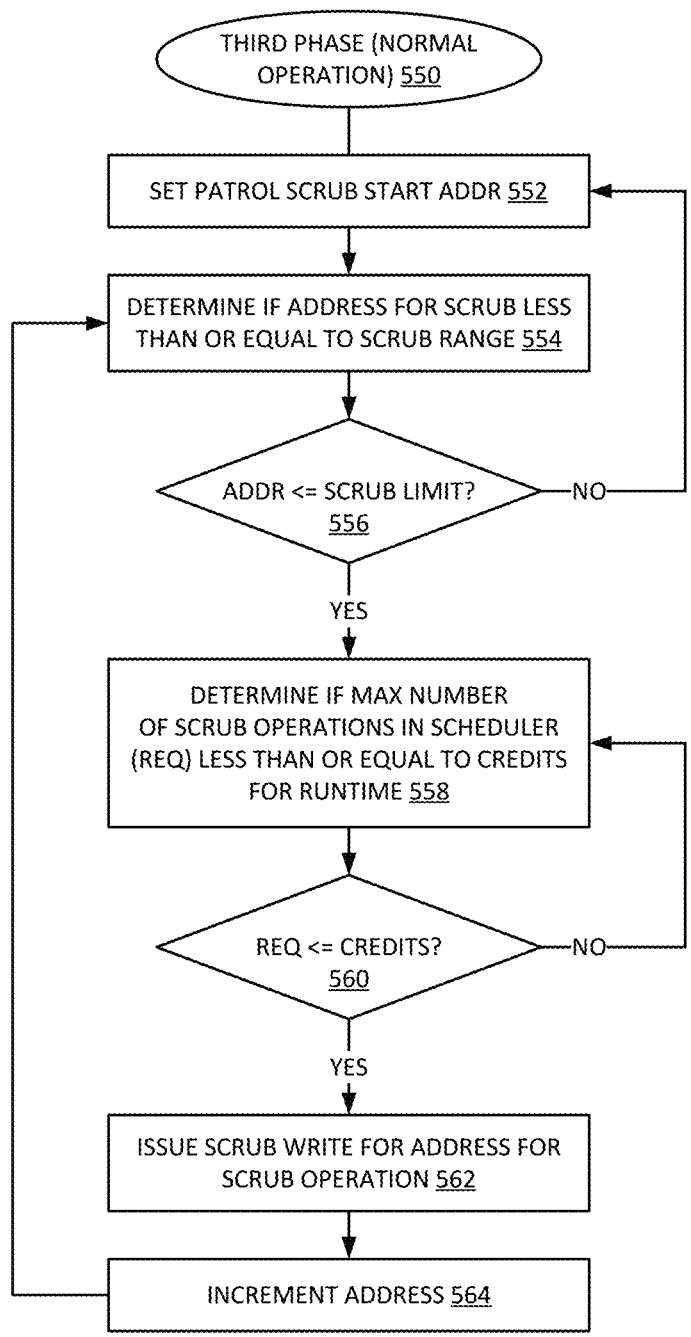
FIG. 5C is a flow diagram of an example of a process for transitioning error scrub hardware from memory initialization to error scrubbing.

FIG. 5C is a flow diagram of an example of a process for transitioning error scrub hardware from memory initialization to error scrubbing. Process 550 represents a process that can be applied by a scrub engine or error scrub hardware as described herein. Process 550 represents a process for a third phase of error scrub hardware operation, for normal operation, after the full memory space has been initialized.

In one example, the system sets a patrol scrub start address, at 552, or the error scrub hardware can obtain the patrol scrub start address from configuration settings. The error scrub hardware can determine if the address for scrub is less than or equal to a scrub range, which could be the full memory address range, at 554.

If the address is greater than the scrub limit, at 556 NO branch, then the error scrub hardware can set the patrol scrub start address for the next portion of memory to scrub, which could be the full memory space, at 552. If the address is less than or equal to the scrub limit (ADDR<=SCRUB LIMIT), at 556 YES branch, then the address is still within the range of the memory space to be scrubbed.

In one example, the error scrub hardware can determine if the maximum number of scrub operations in the scheduler (REQ) is less than or equal to the number of credits for runtime scrub operation, at 558. The REQ is greater than the number of credits, at 560 NO branch, the error scrub hardware can continue to loop and wait until a credit becomes available to generate a new transaction, at 558.

If REQ is less than or equal to the number of credits, at 560 YES branch, the error scrub hardware can issue a scrub write for the address for scrub operation, at 562. The error scrub hardware can increment the address, at 564, and loop back to determine if the address for initialization is within range of the memory address limit, at 564. The error scrub hardware can continue to loop through scrubbing operation while the system is operational.

Figure 6:
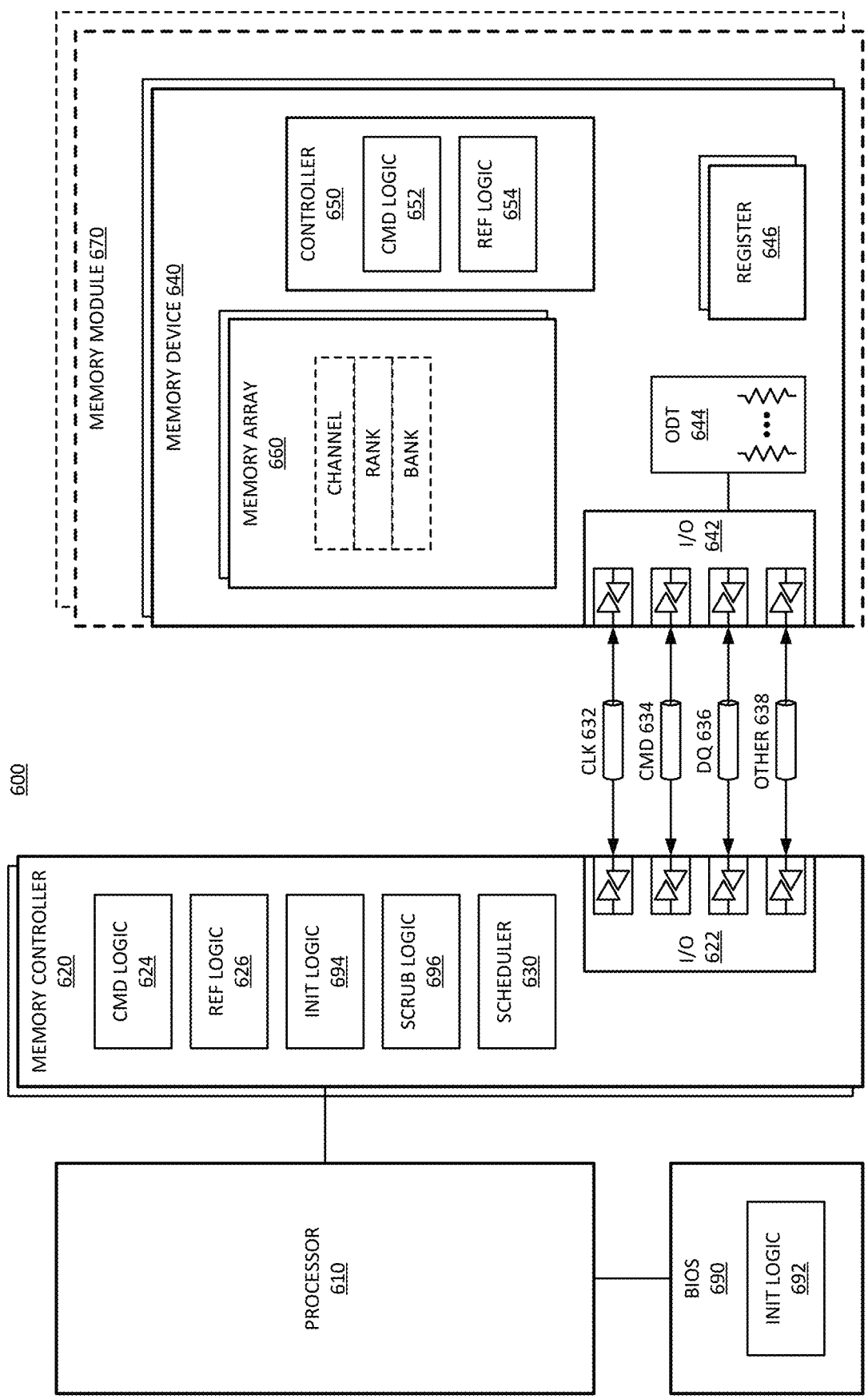
FIG. 6 is a block diagram of an example of a memory subsystem in which phased memory initialization can be implemented.

FIG. 6 is a block diagram of an example of a memory subsystem in which phased memory initialization can be implemented. System 600 includes a processor and elements of a memory subsystem in a computing device. System 600 represents a system in accordance with an example of system 100, system 202, system 204, or system 300.

In one example, memory controller 620 includes initialization (INIT) logic 694. Initialization logic 694 represents logic to perform initialization operations. In one example, initialization logic 694 operates in conjunction with scrub logic 696, which represents error scrub hardware in accordance with any example herein. Scrub logic 696 can be configured to perform initialization operations to initialize memory array 660. In one example, initialization control 694 represents logic within memory controller 620 to utilize the error scrub hardware for memory initialization. In one example, system 600 includes BIOS 690 with initialization (INIT) logic 692. Initialization logic 692 represents logic of BIOS 690 to trigger initialization operations to initialize the system memory and load the BIOS into memory for execution.

Processor 610 represents a processing unit of a computing platform that may execute an operating system (OS) and applications, which can collectively be referred to as the host or the user of the memory. The OS and applications execute operations that result in memory accesses. Processor 610 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 600 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random-access memory), or some variant such as synchronous DRAM (SDRAM). A memory subsystem as described herein may be compatible with a number of memory technologies, such as DDR4 (double data rate version 4, JESD79-4, originally published in September 2012 by JEDEC (Joint Electron Device Engineering Council, now the JEDEC Solid State Technology Association), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, originally published by JEDEC in July 2020), LPDDR5 (LPDDR version 5, JESD209-5, originally published by JEDEC in February 2019), HBM2 ((HBM version 2), currently in discussion by JEDEC), or others or combinations of memory technologies, and technologies based on derivatives or extensions of such specifications.

Memory controller 620 represents one or more memory controller circuits or devices for system 600. Memory controller 620 represents control logic that generates memory access commands in response to the execution of operations by processor 610. Memory controller 620 accesses one or more memory devices 640. Memory devices 640 can be DRAM devices in accordance with any referred to above. In one example, memory devices 640 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 620 manages a separate memory channel, although system 600 can be configured to have multiple channels managed by a single controller, or to have multiple controllers on a single channel. In one example, memory controller 620 is part of host processor 610, such as logic implemented on the same die or implemented in the same package space as the processor.

Memory controller 620 includes I/O interface logic 622 to couple to a memory bus, such as a memory channel as referred to above. I/O interface logic 622 (as well as I/O interface logic 642 of memory device 640) can include pins, pads, connectors, signal lines, traces, or wires, or other hardware to connect the devices, or a combination of these. I/O interface logic 622 can include a hardware interface. As illustrated, I/O interface logic 622 includes at least drivers/transceivers for signal lines. Commonly, wires within an integrated circuit interface couple with a pad, pin, or connector to interface signal lines or traces or other wires between devices. I/O interface logic 622 can include drivers, receivers, transceivers, or termination, or other circuitry or combinations of circuitry to exchange signals on the signal lines between the devices. The exchange of signals includes at least one of transmit or receive. While shown as coupling I/O 622 from memory controller 620 to I/O 642 of memory device 640, it will be understood that in an implementation of system 600 where groups of memory devices 640 are accessed in parallel, multiple memory devices can include I/O interfaces to the same interface of memory controller 620. In an implementation of system 600 including one or more memory modules 670, I/O 642 can include interface hardware of the memory module in addition to interface hardware on the memory device itself. Other memory controllers 620 will include separate interfaces to other memory devices 640.

The bus between memory controller 620 and memory devices 640 can be implemented as multiple signal lines coupling memory controller 620 to memory devices 640. The bus may typically include at least clock (CLK) 632, command/address (CMD) 634, and write data (DQ) and read data (DQ) 636, and zero or more other signal lines 638. In one example, a bus or connection between memory controller 620 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 600 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 620 and memory devices 640. An example of a serial bus technology is 8B10B encoding and transmission of high-speed data with embedded clock over a single differential pair of signals in each direction. In one example, CMD 634 represents signal lines shared in parallel with multiple memory devices. In one example, multiple memory devices share encoding command signal lines of CMD 634, and each has a separate chip select (CS_n) signal line to select individual memory devices.

It will be understood that in the example of system 600, the bus between memory controller 620 and memory devices 640 includes a subsidiary command bus CMD 634 and a subsidiary bus to carry the write and read data, DQ 636. In one example, the data bus can include bidirectional lines for read data and for write/command data. In another example, the subsidiary bus DQ 636 can include unidirectional write signal lines for write and data from the host to memory, and can include unidirectional lines for read data from the memory to the host. In accordance with the chosen memory technology and system design, other signals 638 may accompany a bus or sub bus, such as strobe lines DQS. Based on design of system 600, or implementation if a design supports multiple implementations, the data bus can have more or less bandwidth per memory device 640. For example, the data bus can support memory devices that have either a ×4 interface, a ×8 interface, a ×16 interface, or other interface. The convention "xW," where W is an integer that refers to an interface size or width of the interface of memory device 640, which represents a number of signal lines to exchange data with memory controller 620. The interface size of the memory devices is a controlling factor on how many memory devices can be used concurrently per channel in system 600 or coupled in parallel to the same signal lines. In one example, high bandwidth memory devices, wide interface devices, or stacked memory configurations, or combinations, can enable wider interfaces, such as a ×128 interface, a ×256 interface, a ×512 interface, a ×1024 interface, or other data bus interface width.

In one example, memory devices 640 and memory controller 620 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length eight (BL8), and each memory device 640 can transfer data on each UI. Thus, a ×8 memory device operating on BL8 can transfer 64 bits of data (8 data signal lines times 6 data bits transferred per line over the burst). It will be understood that this simple example is merely an illustration and is not limiting.

Memory devices 640 represent memory resources for system 600. In one example, each memory device 640 is a separate memory die. In one example, each memory device 640 can interface with multiple (e.g., 2) channels per device or die. Each memory device 640 includes I/O interface logic 642, which has a bandwidth determined by the implementation of the device (e.g., ×16 or ×8 or some other interface bandwidth). I/O interface logic 642 enables the memory devices to interface with memory controller 620. I/O interface logic 642 can include a hardware interface, and can be in accordance with I/O 622 of memory controller, but at the memory device end. In one example, multiple memory devices 640 are connected in parallel to the same command and data buses. In another example, multiple memory devices 640 are connected in parallel to the same command bus, and are connected to different data buses. For example, system 600 can be configured with multiple memory devices 640 coupled in parallel, with each memory device responding to a command, and accessing memory resources 660 internal to each. For a Write operation, an individual memory device 640 can write a portion of the overall data word, and for a Read operation, an individual memory device 640 can fetch a portion of the overall data word. The remaining bits of the word will be provided or received by other memory devices in parallel.

In one example, memory devices 640 are disposed directly on a motherboard or host system platform (e.g., a PCB (printed circuit board) on which processor 610 is disposed) of a computing device. In one example, memory devices 640 can be organized into memory modules 670. In one example, memory modules 670 represent dual inline memory modules (DIMMs). In one example, memory modules 670 represent other organization of multiple memory devices to share at least a portion of access or control circuitry, which can be a separate circuit, a separate device, or a separate board from the host system platform. Memory modules 670 can include multiple memory devices 640, and the memory modules can include support for multiple separate channels to the included memory devices disposed on them. In another example, memory devices 640 may be incorporated into the same package as memory controller 620, such as by techniques such as multi-chip-module (MCM), package-on-package, through-silicon via (TSV), or other techniques or combinations. Similarly, in one example, multiple memory devices 640 may be incorporated into memory modules 670, which themselves may be incorporated into the same package as memory controller 620. It will be appreciated that for these and other implementations, memory controller 620 may be part of host processor 610.

Memory devices 640 each include one or more memory arrays 660. Memory array 660 represents addressable memory locations or storage locations for data. Typically, memory array 660 is managed as rows of data, accessed via wordline (rows) and bitline (individual bits within a row) control. Memory array 660 can be organized as separate channels, ranks, and banks of memory. Channels may refer to independent control paths to storage locations within memory devices 640. Ranks may refer to common locations across multiple memory devices (e.g., same row addresses within different devices) in parallel. Banks may refer to sub-arrays of memory locations within a memory device 640. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 640 include one or more registers 644. Register 644 represents one or more storage devices or storage locations that provide configuration or settings for the operation of the memory device. In one example, register 644 can provide a storage location for memory device 640 to store data for access by memory controller 620 as part of a control or management operation. In one example, register 644 includes one or more Mode Registers. In one example, register 644 includes one or more multipurpose registers. The configuration of locations within register 644 can configure memory device 640 to operate in different "modes," where command information can trigger different operations within memory device 640 based on the mode. Additionally or in the alternative, different modes can also trigger different operation from address information or other signal lines depending on the mode. Settings of register 644 can indicate configuration for I/O settings (e.g., timing, termination or ODT (on-die termination) 646, driver configuration, or other I/O settings).

In one example, memory device 640 includes ODT 646 as part of the interface hardware associated with I/O 642. ODT 646 can be configured as mentioned above, and provide settings for impedance to be applied to the interface to specified signal lines. In one example, ODT 646 is applied to DQ signal lines. In one example, ODT 646 is applied to command signal lines. In one example, ODT 646 is applied to address signal lines. In one example, ODT 646 can be applied to any combination of the preceding. The ODT settings can be changed based on whether a memory device is a selected target of an access operation or a non-target device. ODT 646 settings can affect the timing and reflections of signaling on the terminated lines. Careful control over ODT 646 can enable higher-speed operation with improved matching of applied impedance and loading. ODT 646 can be applied to specific signal lines of I/O interface 642, 622 (for example, ODT for DQ lines or ODT for CA lines), and is not necessarily applied to all signal lines.

Memory device 640 includes controller 650, which represents control logic within the memory device to control internal operations within the memory device. For example, controller 650 decodes commands sent by memory controller 620 and generates internal operations to execute or satisfy the commands. Controller 650 can be referred to as an internal controller, and is separate from memory controller 620 of the host. Controller 650 can determine what mode is selected based on register 644, and configure the internal execution of operations for access to memory resources 660 or other operations based on the selected mode. Controller 650 generates control signals to control the routing of bits within memory device 640 to provide a proper interface for the selected mode and direct a command to the proper memory locations or addresses. Controller 650 includes command logic 652, which can decode command encoding received on command and address signal lines. Thus, command logic 652 can be or include a command decoder. With command logic 652, memory device can identify commands and generate internal operations to execute requested commands.

Referring again to memory controller 620, memory controller 620 includes command (CMD) logic 624, which represents logic or circuitry to generate commands to send to memory devices 640. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 640, memory controller 620 can issue commands via I/O 622 to cause memory device 640 to execute the commands. In one example, controller 650 of memory device 640 receives and decodes command and address information received via I/O 642 from memory controller 620. Based on the received command and address information, controller 650 can control the timing of operations of the logic and circuitry within memory device 640 to execute the commands. Controller 650 is responsible for compliance with standards or specifications within memory device 640, such as timing and signaling requirements. Memory controller 620 can implement compliance with standards or specifications by access scheduling and control.

Memory controller 620 includes scheduler 630, which represents logic or circuitry to generate and order transactions to send to memory device 640. From one perspective, the primary function of memory controller 620 could be said to schedule memory access and other transactions to memory device 640. Such scheduling can include generating the transactions themselves to implement the requests for data by processor 610 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 620 typically includes logic such as scheduler 630 to allow selection and ordering of transactions to improve performance of system 600. Thus, memory controller 620 can select which of the outstanding transactions should be sent to memory device 640 in which order, which is typically achieved with logic much more complex that a simple first-in first-out algorithm. Memory controller 620 manages the transmission of the transactions to memory device 640, and manages the timing associated with the transaction. In one example, transactions have deterministic timing, which can be managed by memory controller 620 and used in determining how to schedule the transactions with scheduler 630.

In one example, memory controller 620 includes refresh (REF) logic 626. Refresh logic 626 can be used for memory resources that are volatile and need to be refreshed to retain a deterministic state. In one example, refresh logic 626 indicates a location for refresh, and a type of refresh to perform. Refresh logic 626 can trigger self-refresh within memory device 640, or execute external refreshes which can be referred to as auto refresh commands) by sending refresh commands, or a combination. In one example, controller 650 within memory device 640 includes refresh logic 654 to apply refresh within memory device 640. In one example, refresh logic 654 generates internal operations to perform refresh in accordance with an external refresh received from memory controller 620. Refresh logic 654 can determine if a refresh is directed to memory device 640, and what memory resources 660 to refresh in response to the command.

Figure 7:
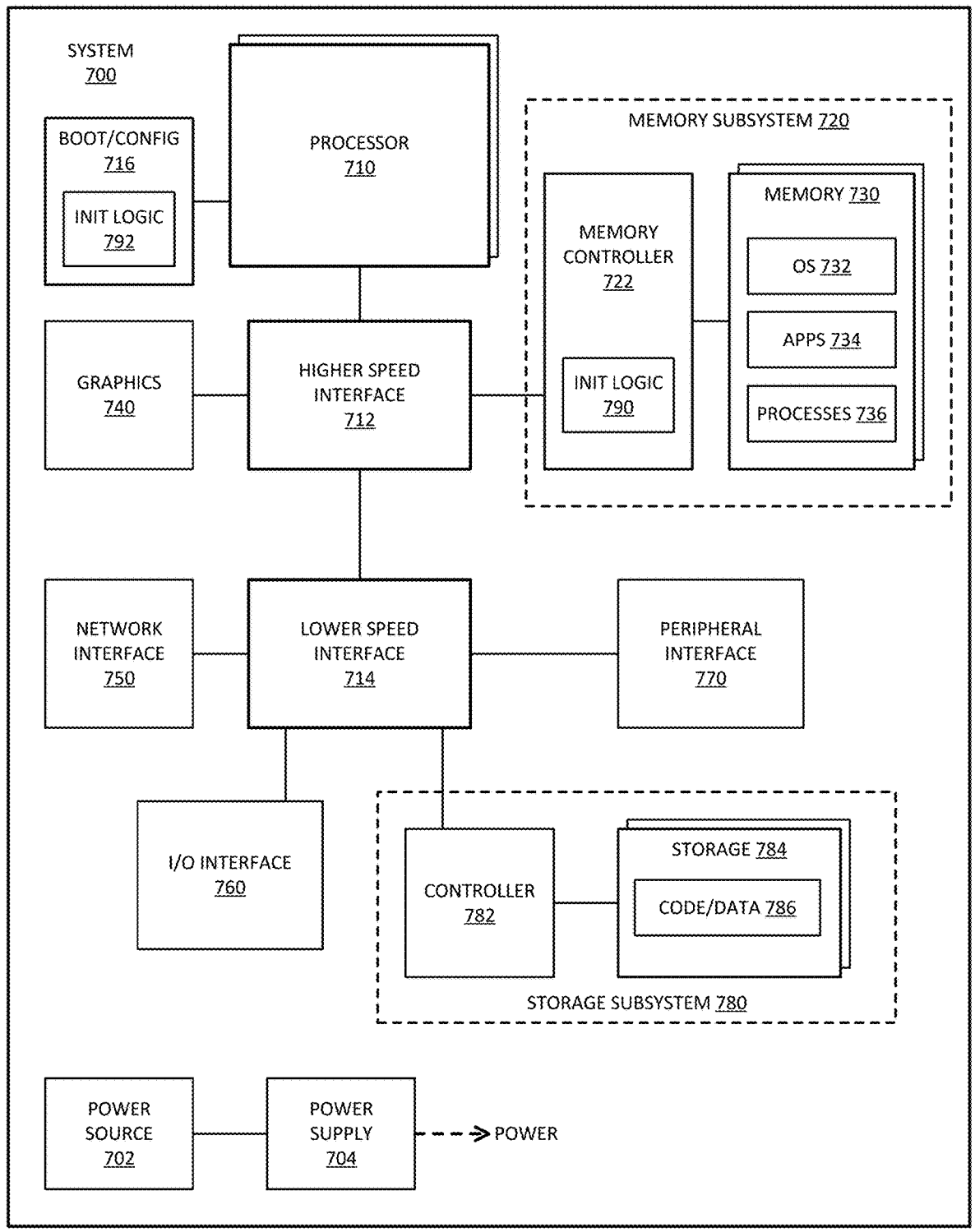
FIG. 7 is a block diagram of an example of a computing system in which phased memory initialization can be implemented.

FIG. 7 is a block diagram of an example of a computing system in which phased memory initialization can be implemented. System 700 represents a computing device in accordance with any example herein, and can be a laptop computer, a desktop computer, a tablet computer, a server, a gaming or entertainment control system, embedded computing device, or other electronic device.

System 700 represents a system in accordance with an example of system 100, system 202, system 204, or system 300. In one example, memory controller 722 includes initialization (INIT) logic 790. Initialization logic 790 represents logic to enable the memory to perform initialization operations. In one example, initialization logic 790 includes error scrub hardware in accordance with any example herein. The error scrub hardware can be configured to perform initialization operations to initialize memory 730. In one example, INIT logic 790 represents logic within memory controller 722 to utilize the error scrub hardware for memory initialization. In one example, system 700 includes boot/config 716 with initialization (INIT) logic 792. In one example, boot/config 716 represents a BIOS system. Initialization logic 792 represents logic of a BIOS to trigger initialization operations to initialize the system memory and load the BIOS into memory for execution.

System 700 includes processor 710 can include any type of microprocessor, central processing unit (CPU), graphics processing unit (GPU), processing core, or other processing hardware, or a combination, to provide processing or execution of instructions for system 700. Processor 710 can be a host processor device. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or a combination of such devices.

System 700 includes boot/config 716, which represents storage to store boot code (e.g., basic input/output system (BIOS)), configuration settings, security hardware (e.g., trusted platform module (TPM)), or other system level hardware that operates outside of a host OS. Boot/config 716 can include a nonvolatile storage device, such as read-only memory (ROM), flash memory, or other memory devices.

In one example, system 700 includes interface 712 coupled to processor 710, which can represent a higher speed interface or a high throughput interface for system components that need higher bandwidth connections, such as memory subsystem 720 or graphics interface components 740. Interface 712 represents an interface circuit, which can be a standalone component or integrated onto a processor die. Interface 712 can be integrated as a circuit onto the processor die or integrated as a component on a system on a chip. Where present, graphics interface 740 interfaces to graphics components for providing a visual display to a user of system 700. Graphics interface 740 can be a standalone component or integrated onto the processor die or system on a chip. In one example, graphics interface 740 can drive a high definition (HD) display or ultra high definition (UHD) display that provides an output to a user. In one example, the display can include a touchscreen display. In one example, graphics interface 740 generates a display based on data stored in memory 730 or based on operations executed by processor 710 or both.

Memory subsystem 720 represents the main memory of system 700, and provides storage for code to be executed by processor 710, or data values to be used in executing a routine. Memory subsystem 720 can include one or more varieties of random-access memory (RAM) such as DRAM, 3DXP (three-dimensional crosspoint), or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710, such as integrated onto the processor die or a system on a chip.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 700 includes interface 714, which can be coupled to interface 712. Interface 714 can be a lower speed interface than interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, NAND, 3DXP, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710, or can include circuits or logic in both processor 710 and interface 714.

Power source 702 provides power to the components of system 700. More specifically, power source 702 typically interfaces to one or multiple power supplies 704 in system 700 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

Figure 8:
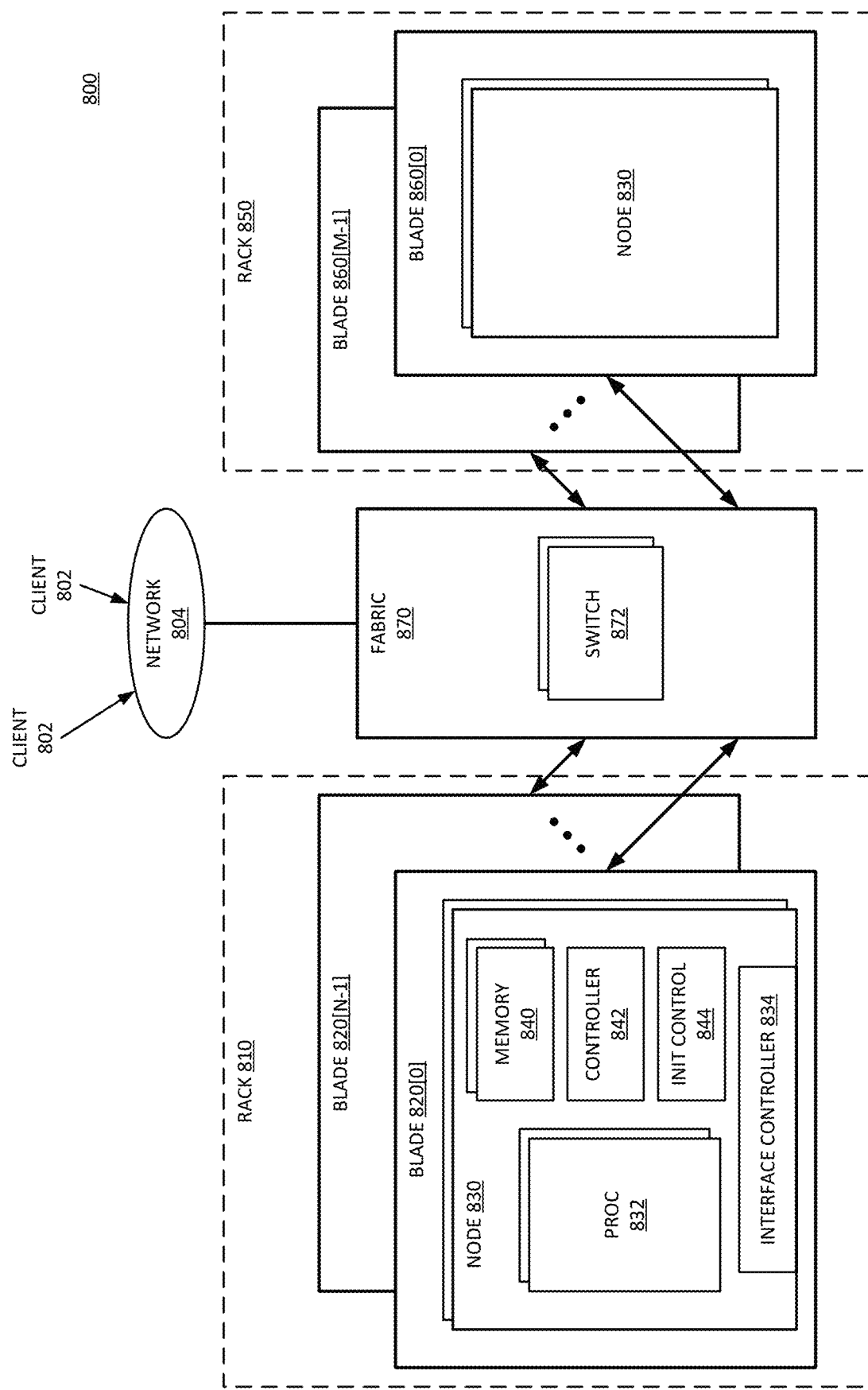
FIG. 8 is a block diagram of an example of a multi-node network in which phased memory initialization can be implemented.

FIG. 8 is a block diagram of an example of a multi-node network in which phased memory initialization can be implemented. System 800 represents a network of nodes that can apply adaptive ECC. In one example, system 800 represents a data center. In one example, system 800 represents a server farm. In one example, system 800 represents a data cloud or a processing cloud.

Node represents a system in accordance with an example of system 100, system 202, system 204, or system 300. Node 830 includes memory 840. Node 830 includes controller 842, which represents a memory controller to manage access to memory 840. In one example, node 830 includes initialization (INIT) control 844, which represents logic to enable the memory to perform initialization operations. In one example, initialization control 844 includes error scrub hardware in accordance with any example herein. In one example, INIT control 844 represents logic within controller 842 to utilize the error scrub hardware for memory initialization. The error scrub hardware can be configured to perform initialization operations to initialize memory 840.

One or more clients 802 make requests over network 804 to system 800. Network 804 represents one or more local networks, or wide area networks, or a combination. Clients 802 can be human or machine clients, which generate requests for the execution of operations by system 800. System 800 executes applications or data computation tasks requested by clients 802.

In one example, system 800 includes one or more racks, which represent structural and interconnect resources to house and interconnect multiple computation nodes. In one example, rack 810 includes multiple nodes 830. In one example, rack 810 hosts multiple blade components 820. Hosting refers to providing power, structural or mechanical support, and interconnection. Blades 820 can refer to computing resources on printed circuit boards (PCBs), where a PCB houses the hardware components for one or more nodes 830. In one example, blades 820 do not include a chassis or housing or other "box" other than that provided by rack 810. In one example, blades 820 include housing with exposed connector to connect into rack 810. In one example, system 800 does not include rack 810, and each blade 820 includes a chassis or housing that can stack or otherwise reside in close proximity to other blades and allow interconnection of nodes 830.

System 800 includes fabric 870, which represents one or more interconnectors for nodes 830. In one example, fabric 870 includes multiple switches 872 or routers or other hardware to route signals among nodes 830. Additionally, fabric 870 can couple system 800 to network 804 for access by clients 802. In addition to routing equipment, fabric 870 can be considered to include the cables or ports or other hardware equipment to couple nodes 830 together. In one example, fabric 870 has one or more associated protocols to manage the routing of signals through system 800. In one example, the protocol or protocols is at least partly dependent on the hardware equipment used in system 800.

As illustrated, rack 810 includes N blades 820. In one example, in addition to rack 810, system 800 includes rack 850. As illustrated, rack 850 includes M blades 860. M is not necessarily the same as N; thus, it will be understood that various different hardware equipment components could be used, and coupled together into system 800 over fabric 870. Blades 860 can be the same or similar to blades 820. Nodes 830 can be any type of node and are not necessarily all the same type of node. System 800 is not limited to being homogenous, nor is it limited to not being homogenous.

For simplicity, only the node in blade 820[0] is illustrated in detail. However, other nodes in system 800 can be the same or similar. At least some nodes 830 are computation nodes, with processor (proc) 832 and memory 840. A computation node refers to a node with processing resources (e.g., one or more processors) that executes an operating system and can receive and process one or more tasks. In one example, at least some nodes 830 are server nodes with a server as processing resources represented by processor 832 and memory 840. A storage server refers to a node with more storage resources than a computation node, and rather than having processors for the execution of tasks, a storage server includes processing resources to manage access to the storage nodes within the storage server.

In one example, node 830 includes interface controller 834, which represents logic to control access by node 830 to fabric 870. The logic can include hardware resources to interconnect to the physical interconnection hardware. The logic can include software or firmware logic to manage the interconnection. In one example, interface controller 834 is or includes a host fabric interface, which can be a fabric interface in accordance with any example described herein.

Processor 832 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 840 can be or include memory devices and a memory controller.

In general with respect to the descriptions herein, in one example a memory device includes: a memory array having an address range; an error scrubbing engine coupled to the memory array, the error scrubbing engine to: initialize a first portion of the memory array and indicate that the first portion is initialized prior to initializing a second portion of the memory array; initialize the second portion of the memory array after a BIOS (basic input/output system) is loaded into the initialized first portion the memory array; and perform scrub operations on the memory array after the first portion and the second portion are initialized.

In one example of the memory device, the error scrubbing engine is to write to a register to indicate that the initialized first portion has been initialized. In accordance with any preceding example of the memory device, in one example, the error scrubbing engine is to share memory access bandwidth to the memory array during initialization of the second portion while BIOS executes. In accordance with any preceding example of the memory device, in one example, the error scrubbing engine is to generate initialization write transactions, with a number of transactions limited by an initialization credit. In accordance with any preceding example of the memory device, in one example, the initialization credit is different for initialization of the first portion and initialization of the second portion. In accordance with any preceding example of the memory device, in one example, the error scrubbing engine is to wait for the initialization write transactions to complete after reaching the number of transactions indicated by the initialization credit before issuing additional initialization write transactions.

In general with respect to the descriptions herein, in one example a computer system including: memory access hardware to initialize a portion of memory of volatile system memory space; and a processor to load a BIOS (basic input/output system) into the initialized portion of memory and initiate execution of the BIOS prior to initialization of a remainder of the memory, the BIOS to execute with the initialized portion of memory indicated as all system memory; wherein the memory access hardware is to initialize the remainder of the memory while BIOS executes.

In one example of the computer system, the initialized portion comprises a portion at least sufficient to load and execute the BIOS. In accordance with any preceding example of the computer system, in one example, the initialized portion comprises a portion only sufficient to load and execute the BIOS. In accordance with any preceding example of the computer system, in one example, the memory access hardware comprises a patrol error scrub engine. In accordance with any preceding example of the computer system, in one example, the patrol error scrub engine is to transition from initialization to patrol scrubbing upon completion of initialization of the volatile system memory space. In accordance with any preceding example of the computer system, in one example, the BIOS is to hot add an initialized portion of the remainder of the memory to the system memory after being initialized. In accordance with any preceding example of the computer system, in one example, the BIOS is to poll a register to determine when the initialized portion of the remainder of the memory has been initialized. In accordance with any preceding example of the computer system, in one example, the BIOS is to share memory access bandwidth to the memory with the memory access hardware while the memory access hardware is to initialize the remainder of the memory while the BIOS executes. In accordance with any preceding example of the computer system, in one example, the memory access hardware is to generate initialization write transactions, with a number of transactions limited by an initialization credit. In accordance with any preceding example of the computer system, in one example, the initialization credit is different for initialization of the portion of the memory and initialization of the remainder of the memory. In accordance with any preceding example of the computer system, in one example, the memory access hardware is to wait for the initialization write transactions to complete after reaching the number of transactions indicated by the initialization credit. In accordance with any preceding example of the computer system, in one example, the processor comprises a multicore host processor; or the computer system includes a display communicatively coupled to the processor; or the computer system includes a network interface communicatively coupled to the processor; or the computer system includes a battery to power the computer system.

In general with respect to the descriptions herein, in one example a method includes: initializing a first portion of a memory array; indicating that the first portion is initialized prior to initializing a second portion of the memory array; initializing the second portion of the memory array after a BIOS (basic input/output system) is loaded into the initialized first portion the memory array; and performing scrub operations on the memory array after the first portion and the second portion are initialized.

In one example of the method, the initializing the first portion and initializing the second portion comprise initializing the memory array with a patrol error scrub engine; wherein the patrol error scrub engine transitions from initialization to patrol scrubbing upon completion of initialization of the memory array. In accordance with any preceding example of the method, in one example, initializing the first portion of the memory array comprises generating initialization write transactions, which are limited by an initialization credit count; and wherein initializing the second portion of the memory array comprises generating initialization write transactions, which are limited by an interim credit count, different from the initialization credit count.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory device, comprising:
a memory array having an address range; and
an error scrubbing engine coupled to the memory array, the error scrubbing engine to:
initialize a first portion of the memory array and indicate that the first portion is initialized prior to initializing a second portion of the memory array, wherein during initialization of the first portion, the error scrubbing engine is to generate write transactions limited by a first initialization credit;
initialize the second portion of the memory array after a BIOS (basic input/output system) is loaded into the initialized first portion the memory array, wherein during initialization of the second portion, the error scrubbing engine is to generate write transactions limited by a second initialization credit that is lower than the first initialization credit; and
perform scrub operations on the memory array during runtime, after the first portion and the second portion are initialized, wherein during runtime, the error scrubbing engine is to generate write transactions limited by a runtime credit that is lower than the second initialization credit.

2. The memory device of claim 1, wherein the error scrubbing engine is to write to a register to indicate that the initialized first portion has been initialized.

3. The memory device of claim 1, wherein the error scrubbing engine is to share memory access bandwidth to the memory array during initialization of the second portion while BIOS executes.

4. The memory device of claim 1, wherein the error scrubbing engine is to wait for the write transactions to complete after reaching a number of transactions indicated by the second initialization credit before issuing additional initialization write transactions.

5. A computer system, comprising:
memory access hardware to initialize a portion of memory of volatile system memory space, including to generate write transactions limited by a first initialization credit; and
a processor to load a BIOS (basic input/output system) into the initialized portion of memory and initiate execution of the BIOS prior to initialization of a remainder of the memory, the BIOS to execute with the initialized portion of memory indicated as all system memory;
wherein the memory access hardware is to initialize the remainder of the memory while BIOS executes, wherein during initialization of the remainder of the memory, the memory access hardware is to generate write transactions limited by a second initialization credit that is lower than the first initialization credit, and wherein and during runtime, after initialization of all system memory, the memory access hardware is to generate write transactions limited by a runtime credit that is lower than the second initialization credit.

6. The computer system of claim 5, wherein the initialized portion comprises a portion at least sufficient to load and execute the BIOS.

7. The computer system of claim 5, wherein the initialized portion comprises a portion only sufficient to load and execute the BIOS.

8. The computer system of claim 5, wherein the memory access hardware comprises a patrol error scrub engine.

9. The computer system of claim 8, wherein the patrol error scrub engine is to transition from initialization to patrol scrubbing upon completion of initialization of the volatile system memory space.

10. The computer system of claim 5, wherein the BIOS is to hot add an initialized portion of the remainder of the memory to the system memory after being initialized.

11. The computer system of claim 5, wherein the BIOS is to poll a register to determine when the initialized portion of the remainder of the memory has been initialized.

12. The computer system of claim 5, wherein the BIOS is to share memory access bandwidth to the memory with the memory access hardware while the memory access hardware is to initialize the remainder of the memory while the BIOS executes.

13. The computer system of claim 5, wherein the memory access hardware is to wait for the initialization write transactions to complete after reaching a number of transactions indicated by the second initialization credit.

14. The computer system of claim 5, wherein one or more of:
the processor comprises a multicore host processor;
the computer system includes a display communicatively coupled to the processor;
the computer system includes a network interface communicatively coupled to the processor; or
the computer system includes a battery to power the computer system.

15. A method comprising:
initializing a first portion of a memory array, including generating write transactions limited by a first initialization credit;
indicating that the first portion is initialized prior to initializing a second portion of the memory array;
initializing the second portion of the memory array after a BIOS (basic input/output system) is loaded into the initialized first portion the memory array, including generating write transactions limited by a second initialization credit that is lower than the first initialization credit; and
performing scrub operations on the memory array after the first portion and the second portion are initialized, including generating write transactions limited by a runtime credit that is lower than the second initialization credit.

16. The method of claim 15, wherein the initializing the first portion and initializing the second portion comprise initializing the memory array with a patrol error scrub engine;
wherein the patrol error scrub engine transitions from initialization to patrol scrubbing upon completion of initialization of the memory array.

* * * * *

UNITED STATES PATENT AND TRADEMARK OFFICE
CERTIFICATE OF CORRECTION

PATENT NO. : 12,321,622 B2
APPLICATION NO. : 17/411960
DATED : June 3, 2025
INVENTOR(S) : Sreenivas Mandava and John V. Lovelace It is certified that error appears in the above-identified patent and that said Letters Patent is hereby corrected as shown below:

In the Claims

Claim 4 should read: The memory device of claim 1, wherein the error scrubbing engine is to wait for the write transactions to complete after reaching a number of transactions indicated by the second initialization credit before issuing additional write transactions.

Claim 13 should read: The computer system of claim 5, wherein the memory access hardware is to wait for the write transactions to complete after reaching a number of transactions indicated by the second initialization credit.

Signed and Sealed this
Twelfth Day of August, 2025

Coke Morgan Stewart
*Acting Director of the United States Patent and Trademark Office*